(12) United States Patent
Kosuge

(10) Patent No.: US 11,249,285 B2
(45) Date of Patent: Feb. 15, 2022

(54) IMAGING LENS WITH FIVE LENSES OF --+-+ REFRACTIVE POWERS

(71) Applicant: KYOCERA Corporation, Kyoto (JP)

(72) Inventor: Masanori Kosuge, Ome (JP)

(73) Assignee: KYOCERA Corporation, Kyoto (JP)

( * ) Notice: Subject to any disclaimer, the term of this patent is extended or adjusted under 35 U.S.C. 154(b) by 124 days.

(21) Appl. No.: 16/663,388

(22) Filed: Oct. 25, 2019

(65) Prior Publication Data

US 2020/0057280 A1 Feb. 20, 2020

Related U.S. Application Data

(63) Continuation of application No. PCT/JP2018/016188, filed on Apr. 19, 2018.

(30) Foreign Application Priority Data

Apr. 26, 2017 (JP) .............................. JP2017-087567

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ............................. G02B 13/0045; G02B 9/60
See application file for complete search history.

(56) References Cited

U.S. PATENT DOCUMENTS

| 6,833,967 | B2 | 12/2004 | Sekita | |
|---|---|---|---|---|
| 7,684,127 | B2 | 3/2010 | Asami | |
| 8,699,150 | B1 * | 4/2014 | Hsieh ................. | G02B 13/0045 359/714 |
| 8,830,298 | B2 | 9/2014 | Abe et al. | |
| 9,310,589 | B2 | 4/2016 | Wakazono et al. | |
| 9,411,135 | B2 | 8/2016 | Jojiki | |
| 2015/0168692 | A1 * | 6/2015 | Kitahara ............ | G02B 13/0045 359/752 |
| 2016/0252707 | A1 | 9/2016 | Emi | |

FOREIGN PATENT DOCUMENTS

| CN | 105705980 A | 6/2016 |
|---|---|---|
| CN | 108254858 A | 7/2018 |
| JP | H0545583 A | 2/1993 |

(Continued)

*Primary Examiner* — Wen Huang
(74) *Attorney, Agent, or Firm* — Viering Jentschura & Partner mbB

(57) ABSTRACT

An imaging lens may include a first lens L1 having negative power, a second lens L2 having negative power, a third lens L3 having positive power, a fourth lens L4 having negative power, and a fifth lens L5 having positive power, arranged in order from the object side. At least one of the third lens L3 and the fifth lens L5 may be formed of glass having a negative temperature coefficient of refractive index. A focal length of an entire system of the imaging lens is represented by f, the temperature coefficient of refractive index of the at least one of the third lens and the fifth lens formed of glass having a negative temperature coefficient of refractive index is represented by dn/dt, and the following conditions may be satisfied: dn/dt<−0.5 and −2.90<f/(dn/dt)<−0.65.

10 Claims, 16 Drawing Sheets

(56) References Cited

FOREIGN PATENT DOCUMENTS

| | | | |
|---|---|---|---|
| JP | H0990213 | A | 4/1997 |
| JP | 2003307674 | A | 10/2003 |
| JP | 3943988 | B2 | 7/2007 |
| JP | 5065159 | B2 | 10/2012 |
| JP | 2013109052 | A | 6/2013 |
| JP | 5272614 | B2 | 8/2013 |
| JP | 2014197130 | A | 10/2014 |
| JP | 2014209226 | A | 11/2014 |
| JP | 2016057563 | A | 4/2016 |
| JP | 2016114648 | A | 6/2016 |
| JP | 2016126133 | A | 7/2016 |
| JP | 2016142767 | A | 8/2016 |
| JP | 2018109667 | A | 7/2018 |

\* cited by examiner

Example 1

Example 1

Example 1

Example 2

Example 2

Example 2

Example 3

Example 3

Example 3

Example 4

Example 4

Example 4

Example 5

Example 5

Example 5

Example 6

Example 6

Example 6

Example 7

Example 7

Example 7

Example 8

Example 8

Example 8

Example 9

Example 9

Example 9

Example 10

Example 10

Example 10

Example 11

Example 11

Example 11

Example 12

Example 12

Example 12

IMAGING LENS WITH FIVE LENSES OF −+−−+ REFRACTIVE POWERS

CROSS-REFERENCE TO RELATED APPLICATIONS

This application is a Continuation under 35 U.S.C. 120 of PCT International Application No. PCT/JP2018/016188 filed on Apr. 19, 2018, which claims priority under 35 U.S.C 119(a) to Japanese Patent Application No. 2017-087567 filed on Apr. 26, 2017, which are hereby entirely incorporated by reference.

TECHNICAL FIELD

The present application relates to an imaging lens having a configuration of five lenses in five groups.

BACKGROUND

In recent years, surveillance cameras, in-vehicle cameras and so on are in widespread use. As an imaging lens for the surveillance cameras and in-vehicle cameras (referred to as the "in-vehicle cameras, etc."), for example, an imaging lens having a configuration of five lenses in five groups has been described (JP2003-307674A, JP3943988B (corresponding to U.S. Pat. No. 6,833,967B2), JP5065159B (corresponding to U.S. Pat. No. 7,684,127B2), and JP2016-057563A). Since the in-vehicle cameras, etc. are used in harsh environments such as large temperature changes, for example, an imaging lens that can maintain optical performance even when a temperature change is caused (referred to as the temperature compensation) has also been described (JP5272614B (corresponding to U.S. Pat. No. 8,830,298B2) and JP2014-197130A (corresponding to U.S. Pat. No. 9,310,589B2)).

In addition, as an imaging lens having a configuration of five lenses in five groups to be used other than the in-vehicle cameras, etc., for example, an imaging lens has been described in each of JPH05-045583A and JPH09-090213A. Further, as an imaging lens performing temperature compensation to be used other than the in-vehicle cameras, etc., an imaging lens has been described in each of JP2016-114648A (corresponding to U.S. Pat. No. 9,411,135B2), JP2016-126133A and JP2016-142767A.

SUMMARY

As described above, since the in-vehicle cameras, etc. are used in a harsh environment, the in-vehicle cameras, etc. are required to have durability against changes in environmental temperature and so on (hereinafter referred to as the environmental resistance). For example, since the in-vehicle cameras, etc., which image blind spots of automobiles, are often installed outside a car body, the environmental temperature may be minus degrees Celsius on the low temperature side, and may be 100 degrees Celsius or higher on the high temperature side. For this reason, the imaging lens constituting the in-vehicle cameras, etc. is required to perform the temperature compensation in a very large range.

On the other hand, with the spread of the in-vehicle cameras, etc., the imaging lens is required to have a simple configuration with lower cost and excellent mass productivity. In order to make the imaging lens have a simple configuration with low-cost and excellent mass productivity, specifically, it is desirable that the number of lenses to be configured is as small as possible. In addition, it is desirable that error amounts with respect to design values such as thickness or inclination due to temperature change (including manufacturing errors) has little impact to the optical performance such as aberrations of the imaging lens (hereinafter referred to as "low error sensitivity").

An object of the present application is to provide a imaging lens suitable for in-vehicle cameras, etc., with lower cost and excellent mass productivity.

An imaging lens according to a non-limiting embodiment may include, in order from an object side, a first lens, a second lens, a third lens, a fourth lens, a fifth lens, and aperture stop. The first lens may have negative power. The second lens may have negative power. The third lens may have positive power. The fourth lens may have negative power. The fifth lens may have positive power. The aperture stop may be disposed between the second lens and the third lens. At least one of the third lens and the fifth lens may be formed of glass having a negative temperature coefficient of refractive index. A focal length of an entire system of the imaging lens is represented by f, the temperature coefficient of refractive index of the at least one of the third lens and the fifth lens formed of glass having a negative temperature coefficient of refractive index is represented by dn/dt, and the following conditions may be satisfied:

$dn/dt < -0.5$ and $-2.90 < f/(dn/dt) < -0.65.$

The third lens may be formed of glass having a negative temperature coefficient of refractive index, and the focal length of the entire system of the imaging lens is represented by f, the temperature coefficient of refractive index of the third lens is represented by $dn_3/dt$, and a following condition may be satisfied:

$-2.90 < f/(dn_3/dt) < -0.80.$

The third lens may be formed of glass having a negative temperature coefficient of refractive index, and a focal length of the third lens is represented by $f_3$, the temperature coefficient of refractive index of the third lens is represented by $dn_3/dt$, and a following condition may be satisfied:

$-6.50 < f_3/(dn_3/dt) < -0.80.$

Third lens may be formed of glass having a negative temperature coefficient of refractive index, and a focal length of the third lens is represented by $f_3$; a focal length of a rear group including the third lens, the fourth lens, and the fifth lens is represented by $f_{35}$; and a following condition may be satisfied:

$0.60 < f_3/f_{35} < 2.05.$

The fifth lens may be formed of glass having a negative temperature coefficient of refractive index, and the focal length of the entire system of the imaging lens is represented by f, the temperature coefficient of refractive index of the fifth lens is represented by $dn_5/dt$, and a following condition may be satisfied:

$-2.50 < f/(dn_5/dt) < -0.65.$

The fifth lens may be formed of glass having a negative temperature coefficient of refractive index, and a focal length of the fifth lens is represented by $f_5$, the temperature coefficient of refractive index of the fifth lens is represented by $dn_5/dt$, and a following condition may be satisfied:

$-8.50 < f_5/(dn_5/dt) < -0.85.$

The fifth lens may be formed of glass having a negative temperature coefficient of refractive index, and a focal length of the fifth lens is represented by $f_5$; a focal length of a rear group including the third lens, the fourth lens, and the fifth lens is represented by $f_{35}$; and a following condition may be satisfied:

$$0.70 < f_5/f_{35} < 7.00.$$

A focal length of the rear group including the third lens, the fourth lens, and the fifth lens is represented by $f_{35}$; a distance from an object side surface of the third lens to an image side surface of the fifth lens is represented by $D_{35}$; and a following condition may be satisfied:

$$0.90 < D_{35}/f_{35} < 1.40.$$

A focal length of the rear group including the third lens, the fourth lens, and the fifth lens is represented by $f_{35}$; a distance from an object side surface of the first lens to an image side surface of the fifth lens is represented by TT; and a following condition may be satisfied:

$$2.50 < TT/f_{35} < 4.50.$$

According to a non-limiting aspect of the present application, the first lens may have negative power, the second lens may have negative power, the third lens may have positive power, the fourth lens may have negative power, and the fifth lens may have positive power in order from an object side, in which at least one of the third lens and the fifth lens may be formed of glass having a negative temperature coefficient of refractive index, and the focal length of the entire system of the imaging lens is represented by f, the temperature coefficient of refractive index of the at least one of the third lens and the fifth lens formed of glass having a negative temperature coefficient of refractive index is represented by dn/dt, and the condition $-2.90 < f/(dn/dt) < -0.65$ may be satisfied. Accordingly, an imaging lens suitable for in-vehicle cameras, etc., with lower cost and excellent mass productivity can be provided.

DETAILED DESCRIPTION

Figure 1:
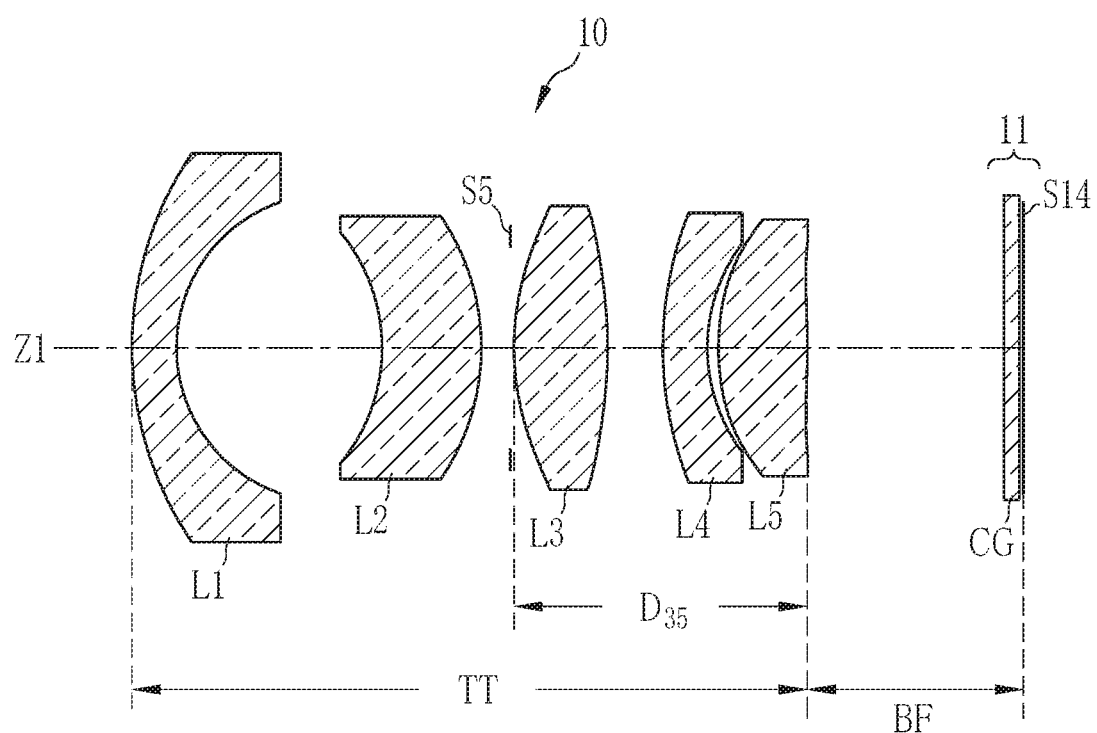
FIG. 1 is an external side view of an imaging lens.

As illustrated in FIG. 1, an imaging lens 10 is a lens for forming an image of an object on an imaging surface S14 of an image sensor 11, for imaging the object. The imaging lens 10 has a configuration of five lenses in five groups, including a first lens L1 having negative power, a second lens L2 having negative power, a third lens L3 having positive power, a fourth lens L4 having negative power, and a fifth lens L5 having positive power, arranged in order from the object side along an optical axis Z1. In addition, the imaging lens 10 includes an aperture stop S5 between the second lens L2 and the third lens L3. Since the imaging surface S14 of the image sensor 11 is protected with a cover glass CG, the imaging lens 10 forms an image of an object on the imaging surface S14 via the cover glass CG.

In the imaging lens 10, the first lens L1 is formed of a material having excellent durability so that it may be exposed to the installation environment. The second lens L2 has less power than the first lens L1, the third lens L3, the fourth lens L4, and the fifth lens L5, but contributes to correction of distortion and chromatic aberration. The third lens L3 mainly contributes to correction of spherical aberration. The fourth lens L4 mainly contributes to correction of astigmatism and chromatic aberration by forming a so-called air lens formed with air between the fourth lens L5. The fifth lens L5 mainly contributes to correction of astigmatism and field curvature.

In this non-limiting embodiment, the first lens L1, the second lens L2, the third lens L3, the fourth lens L4, and the fifth lens L5 are all made of glass. Accordingly, the first lens L1, the second lens L2, the third lens L3, the fourth lens L4, and the fifth lens L5 have higher environmental resistance than in case they are made of a resin that easily expands or contracts due to temperature changes. Note that any one or more of the first lens L1, the second lens L2, the third lens L3, the fourth lens L4, and the fifth lens L5 can be made of resin. One or a plurality of lens frames and spacers (not shown) of the imaging lens 10 are made of resin, but these can be changed to a material (metal or the like) having higher environmental resistance.

The first lens L1, the second lens L2, and the fourth lens L4 are spherical lenses in which both the object side and the image side are formed as spherical surfaces. The first lens L1 has a meniscus shape convex to the object side. The second lens L2 has a meniscus shape convex to the image side. The fourth lens L4 has a meniscus shape convex to the object side. The first lens L1, the second lens L2, and the fourth lens L4 are all so-called concave lenses having negative power. The temperature coefficient of refractive index of each of the first lens L1, the second lens L2, and the fourth lens L4 is positive. The second lens L2 has less power than the first lens L1, the third lens L3, the fourth lens L4, and the fifth lens L5.

The third lens L3 and the fifth lens L5 are both so-called convex lenses having positive power. The third lens L3 and the fifth lens L5 may have a meniscus shape convex to the object side or the image side, or a biconvex shape convex to both the object side and the image side. Each of the third lens L3 and the fifth lens L5 is an aspherical lens in which at least one of the object side or the image side surface is aspherical.

In the imaging lens 10, at least one of the third lens L3 and the fifth lens L5 is formed of glass having a negative temperature coefficient of refractive index. In addition, the focal length of the entire system of the imaging lens 10 (unit is mm, the same applies hereinafter) is represented by f, the temperature coefficient of refractive index of the at least one of the third lens L3 and the fifth lens L5 formed of glass having a negative temperature coefficient of refractive index is represented by dn/dt (That is, the temperature coefficient of refractive index of at least one of the third lens L3 and the fifth lens L5 is represented by dn/dt), following conditions (1) and (2) are satisfied. The temperature coefficient dn/dt is the temperature coefficient $dn_3/dt$ of the refractive index n3 of the third lens L3 in case the third lens L3 is made of glass having a negative temperature coefficient of refractive index (see condition (3)), and is the temperature coefficient $dn_5/dt$ of the refractive index n5 of the fifth lens L5 in case the fifth lens L5 is made of glass having a negative temperature coefficient of refractive index (see condition (7)). In case both the third lens L3 and the fifth lens L5 are made of glass having a negative temperature coefficient of refractive index, both the temperature coefficient $dn_3/dt$ of the refractive index n3 of the third lens L3 and the temperature coefficient $dn_5/dt$ of the refractive index n5 of the fifth lens L5 satisfy the conditions (1) and (2):

$$dn/dt < -0.5 \tag{1}$$

$$-2.90 < f/(dn/dt) < -0.65 \tag{2}$$

By forming the third lens L3 or the fifth lens L5 with a glass whose temperature coefficient of refractive index is negative, the imaging lens 10 changes its back focus BF according to partial or total expansion of the imaging lens 10 or a unit including the imaging lens 10 due to a temperature change in an environment where the imaging lens 10 is placed. As a result, the imaging lens 10 maintains suitable imaging performance in a wide temperature range from a low temperature (eg, 0° C. or lower) to a high temperature (eg, 100° C. or higher). The condition (1) represents that the temperature coefficient of refractive index is substantially negative. Therefore, the condition (1) is the condition for excluding those in which dn/dt is −0.5 or more and hardly contributes to the adjustment of the back focus BF even if the temperature coefficient of refractive index is negative.

The condition (2) is the condition for keeping the change of the back focus BF of the imaging lens 10 caused by the temperature change of the environment where the imaging lens 10 is placed, within a range where a suitable imaging performance can be maintained in a wide temperature range from low temperature to high temperature. In case the value of f/(dn/dt) is more than the upper limit of condition (2), the back focus BF becomes too short at high temperatures, making it difficult to obtain suitable imaging performance. Conversely, in case the value of f/(dn/dt) is less than the lower limit of condition (2), the back focus BF becomes too long at high temperatures, making it difficult to obtain suitable imaging performance. Further, in case the value of f/(dn/dt) is more than the upper limit of the condition (2), the back focus BF becomes too short at low temperatures, and it becomes difficult to obtain suitable imaging performance, and in case the value of f/(dn/dt) is less than the lower limit of the condition (2), the back focus becomes too long at low temperatures, making it difficult to obtain suitable imaging performance.

As described above, the temperature compensation by adjusting the back focus BF is more effective or more accurate in case a lens having a positive power is formed of glass having a negative temperature coefficient of refractive index. Therefore, in the imaging lens 10, since the third lens L3 and the fifth lens L5 have positive power, the third lens L3 and/or the fifth lens L5 is formed of glass having a negative temperature coefficient of refractive index.

The back focus BF of the imaging lens 10 is the distance from the image side surface of the fifth lens L5 to the imaging surface S14. In this specification, "suitable imaging performance" means that an MTF (Modulation Transfer Function) of a line pair of 60 lines/mm (cycle/mm) (hereinafter simply referred to as the MTF) 150.4 or more (40% or more). In human vision, it can be seen that the image is clearly blurred in case the MTF is about 0.2 or less. In case the MTF is about 0.3 or more, the imaging lens 10 can withstand practical use, and in case the MTF is about 0.4 or more, the imaging lens 10 can be used suitably.

In case that the third lens L3 is formed using glass with a negative temperature coefficient of refractive index, the focal length of the entire system is represented by f, and the temperature coefficient of the refractive index n3 of the third lens L3 is represented by $dn_3/dt$, the imaging lens 10 satisfies at least a following condition (3), and may alternatively satisfy a following condition (4):

$$-2.90 < f/(dn_3/dt) < -0.65 \quad (3)$$

$$-2.90 < f/(dn_3/dt) < -0.80 \quad (4).$$

In addition, in case that the third lens L3 is formed using glass with a negative temperature coefficient of refractive index, the focal length of the third lens L3 is represented by $f_3$, and the temperature coefficient of the refractive index n3 of the third lens L3 is represented by $dn_3/dt$, the imaging lens 10 satisfies a following condition (5):

$$-6.50 < f_3/(dn_3/dt) < -0.80 \quad (5).$$

Further, in case that the third lens L3 is formed using glass with a negative temperature coefficient of refractive index, the focal length of the third lens L3 is represented by $f_3$, and the focal length of the rear group including the third lens L3, the fourth lens L4 and the fifth lens L5 is represented by $f_{35}$, the imaging lens 10 satisfies a following condition (6):

$$0.60 < f_3/f_{35} < 2.05 \quad (6).$$

Note that in this specification, the rear group refers to a lens group included in the image plane side with respect to the aperture stop S5 provided between the second lens L2 and the third lens L3.

On the other hand, in case that the fifth lens L5 is formed using glass with a negative temperature coefficient of refractive index, the focal length of the entire system is represented by f, and the temperature coefficient of the refractive index n5 of the fifth lens L5 is represented by $dn_5/dt$, the imaging lens 10 satisfies at least a following condition (7), and may alternatively satisfy a following condition (8):

$$-2.90 < f/(dn_5/dt) < -0.65 \quad (7)$$

$$-2.50 < f/(dn_5/dt) < -0.65 \quad (8).$$

In addition, in case that the fifth lens L5 is formed using glass with a negative temperature coefficient of refractive index, the focal length of the fifth lens L5 is represented by $f_5$, and the temperature coefficient of the refractive index n5 of the fifth lens L5 is represented by $dn_5/dt$, the imaging lens 10 satisfies a following condition (9):

$$-8.50 < f_5/(dn_5/dt) < -0.85 \quad (9).$$

Further, in case that the fifth lens L5 is formed using glass with a negative temperature coefficient of refractive index, the focal length of the fifth lens L5 is represented by $f_5$, and the focal length of the rear group including the third lens L3, the fourth lens L4 and the fifth lens L5 is represented by $f_{35}$, the imaging lens 10 satisfies a following condition (10):

$$0.70 < f_5/f_{35} < 7.00 \quad (10).$$

In case that both the third lens L3 and the fifth lens L5 are formed using glass with a negative temperature coefficient of refractive index, the imaging lens 10 satisfies both the condition (3) or (4) for the case that the third lens L3 is formed using glass with a negative temperature coefficient of refractive index and the condition (7) or (8) for the case that the fifth lens L5 is formed using glass with a negative temperature coefficient of refractive index. Further, in case that both the third lens L3 and the fifth lens L5 are formed using glass with a negative temperature coefficient of refractive index, the imaging lens 10 satisfies the condition (5), (6), (9) or (10) in addition to the above.

Furthermore, in case that the focal length of the rear group including the third lens L3, the fourth lens L4 and the fifth lens L5 is represented by $f_{35}$, and the distance from the object side surface of the third lens L3 to the image side surface of the fifth lens L5 is represented by $D_{35}$, the imaging lens 10 satisfies a following condition (11):

$$0.90 < D_{35}/f_{35} < 1.40 \quad (11).$$

Furthermore, in case that the focal length of the rear group including the third lens L3, the fourth lens L4 and the fifth lens L5 is represented by $f_{35}$, and the distance from the object side surface of the first lens L1 to the image side surface of the fifth lens L5 is represented by TT, the imaging lens 10 satisfies a following condition (12). The condition (12) is a condition for configuring the imaging lens 10 to be compact. In case that the value of $TT/f_{35}$ is more than the upper limit of the condition (12), the imaging lens 10 becomes larger, and in case that the value of $TT/f_{35}$ is less than the lower limit of the condition (12), it becomes difficult to obtain good imaging performance.

$$2.50 < TT/f_{35} < 4.50 \quad (12).$$

EXAMPLES

Figure 2:
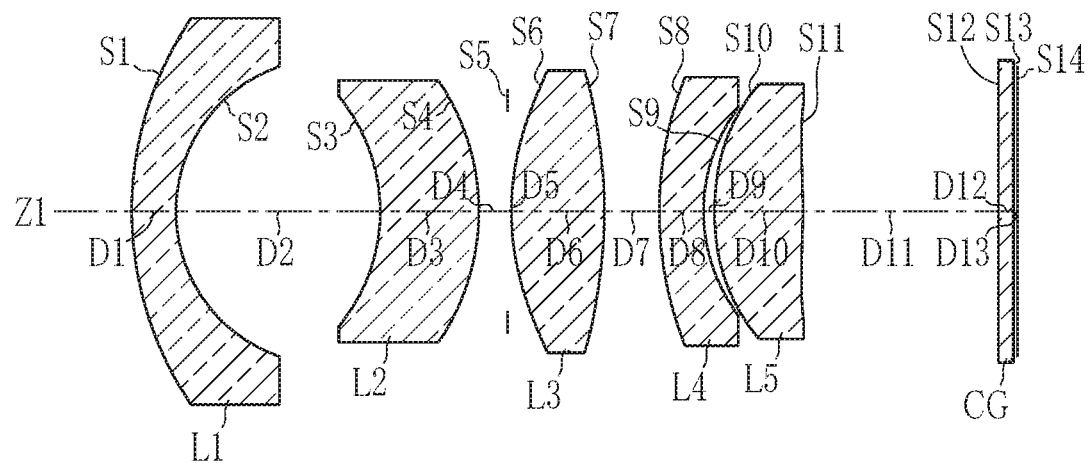
FIG. 2 is an external side view of an imaging lens of Example 1.

Examples of the imaging lens 10 will be described below. FIG. 2 is an external side view of an imaging lens of Example 1. Each surface number is indicated by Si (i=1 to 14) in order from the object side surface S1 of the first lens L1. S5 is the aperture stop, S12 is the object side surface of the cover glass CG, S13 is the image side surface of the cover glass CG, and S14 is the imaging surface of the image sensor 11. Each distance is indicated by Di (i=1 to 13, unit mm) which is the distance between the surface Si and the surface Si+1 along the optical axis Z1. The distance $D_{35}$ from the object side surface S6 of the third lens L3 to the image side surface S11 of the fifth lens L5 is the sum of D6 to D10 ($D_{35}$=D6+D7+D8+D9+D10). The distance TT from the object side surface S1 of the first lens L1 to the image side surface S11 of the fifth lens L5 is the sum of D1 to D10 (TT=D1+D2+D3+D4+D5+D6+D7+D8+D9+D10).

Lens data of Example 1 is shown in Tables 1 and 2 below. Table 1 shows the surface number i of each surface Si, the curvature radius Ri (i=1 to 12, unit mm) of each surface Si, the distance Di, the refractive index n for d-line (wavelength 587.6 nm), the Abbe number vd (=(nd−1)/(nF−nC); nF is the refractive index for F-line (wavelength 486.1 nm), and nC is the refractive index for C-line (wavelength 656.3 nm)), and the temperature coefficient dn/dt of the refractive index n, of the imaging lens 10 of Example 1. In addition, the "*" mark attached to the surface number "i" indicates that it is an aspherical surface. Surfaces that does not have the "*" mark in the surface number "i" are spherical. Note that the temperature coefficient of the refractive index dn/dt is a value in the temperature range of 20° C. or more and 40° C. or less (the same applies to other examples described later).

TABLE 1

Example 1 Basic lens data

| i | Ri | Di | n | vd | dn/dt (×10$^{-6}$/° C.) |
|---|---|---|---|---|---|
| 1 | 9.166 | 1.2 | 1.713 | 53.9 | 4.3 |
| 2 | 4.109 | 5.53 | | | |
| 3 | −4.819 | 2.67 | 1.816 | 46.6 | 4.8 |
| 4 | −6.196 | 0.78 | | | |
| 5 (Stop) | inf | 0.1 | | | |
| 6* | 7.084 | 2.52 | 1.618 | 63.3 | −3.6 |
| 7* | −12.006 | 1.49 | | | |
| 8 | 9.642 | 1.2 | 1.95906 | 17.5 | 4.3 |
| 9 | 4.611 | 0.3 | | | |
| 10* | 6.873 | 2.39 | 1.51633 | 64.1 | 2.8 |

TABLE 1-continued

Example 1 Basic lens data

| i | Ri | Di | n | vd | dn/dt (x10⁻⁶/° C.) |
|---|---|---|---|---|---|
| 11* | −26.522 | 5.3 | | | |
| 12 (CG) | inf | 0.4 | 1.51633 | 64.1 | 2.8 |
| 13 (CG) | inf | 0.12 | | | |
| 14 (Imaging surface) | inf | | | | |

The aspheric surface is represented by a following aspheric expression of Equation 1. In the following aspheric expression of Equation 1, "Z" is the depth (mm) of the aspheric surface, "h" is the distance from the optical axis to the lens surface (mm), "C" is the paraxial curvature (that is, in the case where the paraxial curvature radius is R (mm), C=1/R), "K" is the conic constant, and "Ai" is the aspherical coefficient. In Table 2, "K" and "Ai" of each aspherical surface (see "*" mark in Table 1) of Example 1 are shown.

$$Z = \frac{Ch^2}{1 + \sqrt{1 - (K+1)(Ch)^2}} + \sum A_i h^i \quad [\text{Equation 1}]$$

TABLE 2

Example 1 Aspherical data

| Aspherical coefficient | S6 | S7 | S10 | S11 |
|---|---|---|---|---|
| K | 4.52300E−02 | −5.08500E−01 | 1.98738E+00 | −1.01648E+02 |
| A4 | −3.47616E−04 | 9.69496E−04 | 2.23519E−03 | 1.82948E−03 |
| A6 | −2.28025E−06 | −3.50464E−05 | −8.94522E−05 | 3.19649E−05 |
| A8 | −3.31707E−07 | −3.07315E−07 | −8.83950E−07 | 3.65492E−06 |
| A10 | −6.09738E−08 | −2.38562E−08 | −3.51380E−07 | −5.45364E−07 |

As described above, in the imaging lens 10 of Example 1, the third lens L3 is formed of glass having a negative temperature coefficient of refractive index. And, as shown in Table 3 below, the imaging lens 10 of Example 1 satisfies the conditions of the conditions (1) and (4) (the conditions (2) to (4)), the condition (5), the condition (6), the condition (11) and the condition (12).

TABLE 3

Example 1 Lens data

| | |
|---|---|
| f/(dn₃/dt) | −1.5 |
| f₃/(dn₃/dt) | −2.1 |
| f₃/f₃₅ | 0.98 |
| D₃₅/f₃₅ | 1.03 |
| TT/f₃₅ | 3.12 |

Figure 3A:
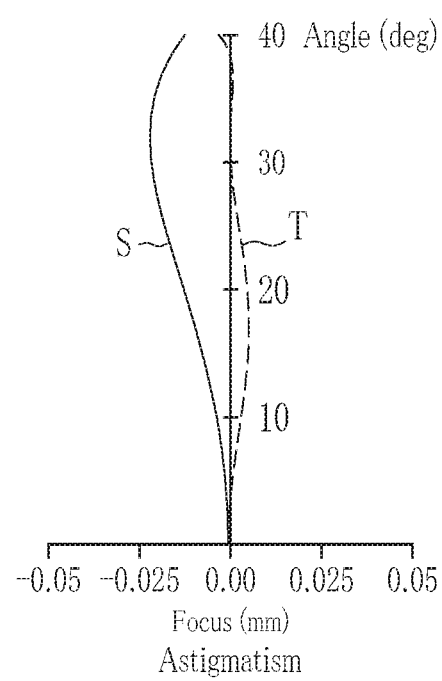
FIG. 3A is a graph which illustrates astigmatism at 20° C. in Example 1.
Figure 3B:
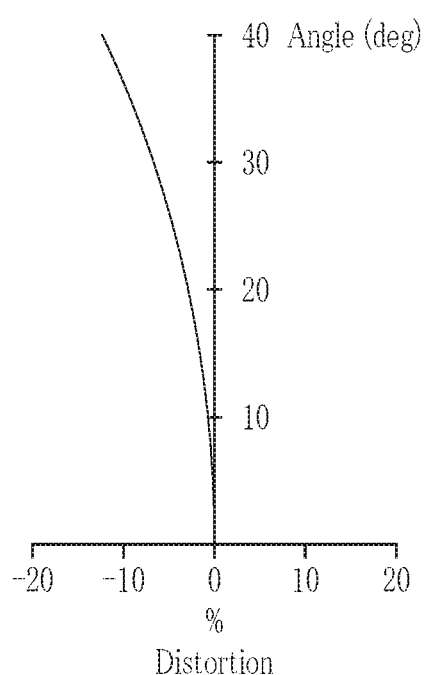
FIG. 3B is a graph which illustrates distortion at 20° C. in Example 1.
Figure 4:
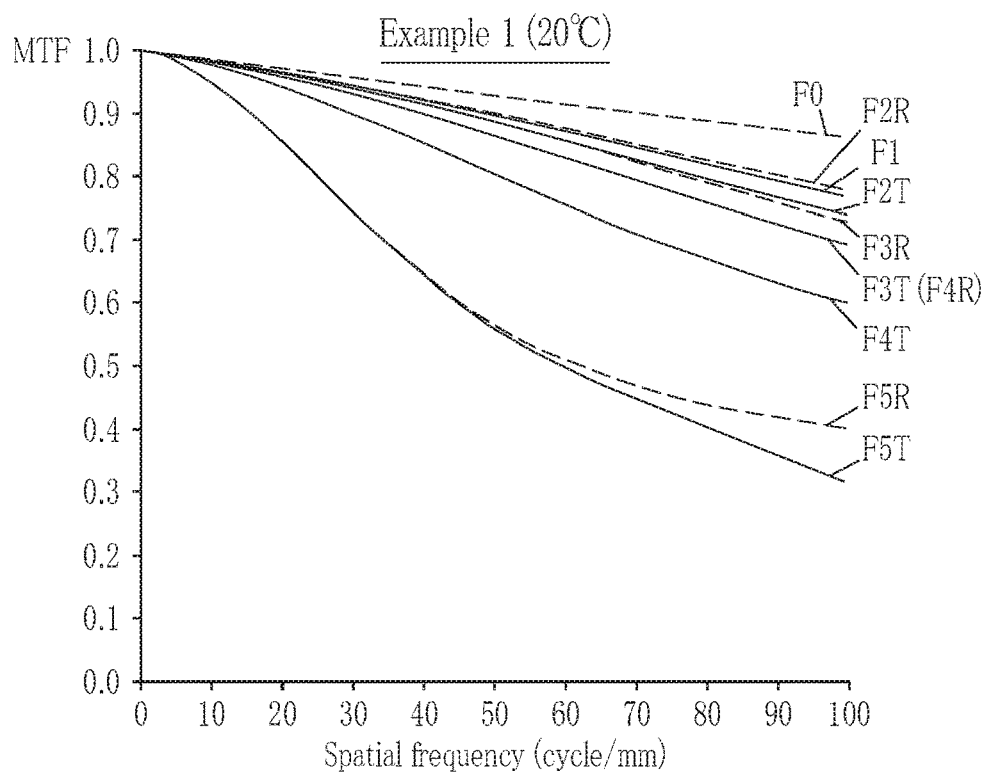
FIG. 4 is a graph which illustrates MTF at 20° C. in Example 1.
Figure 5:
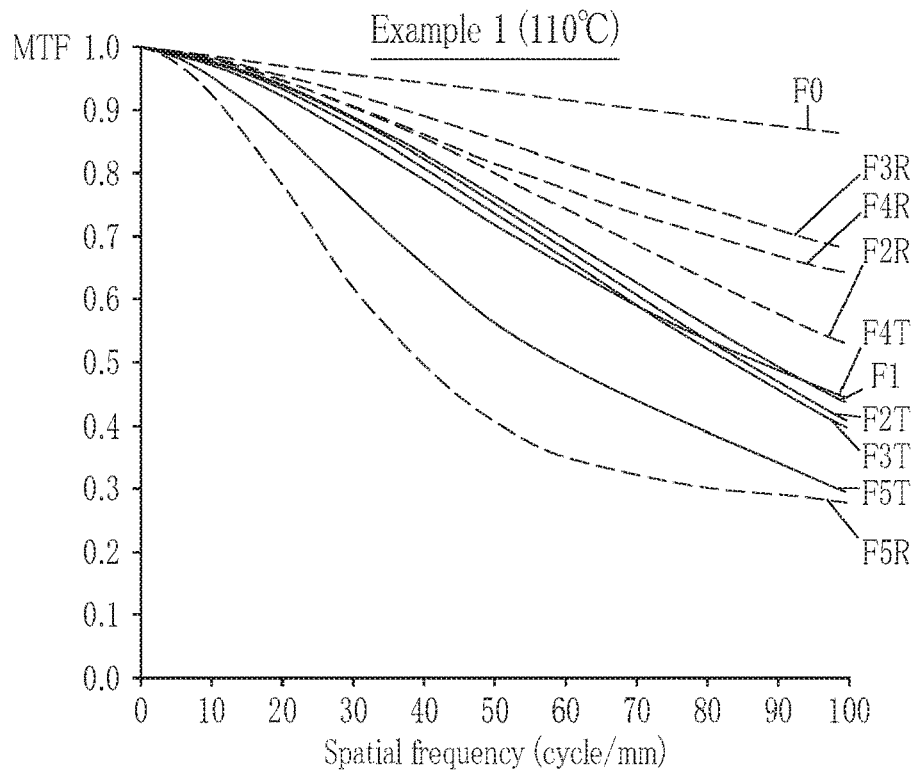
FIG. 5 is a graph which illustrates MTF at 110° C. in Example 1.
Figure 6:
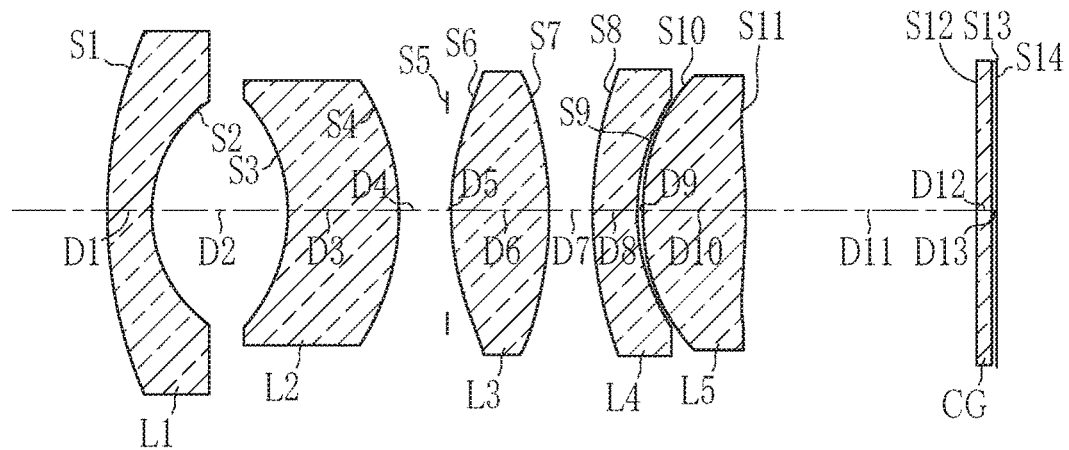
FIG. 6 is an external side view of an imaging lens of Example 2.
Figure 7A:
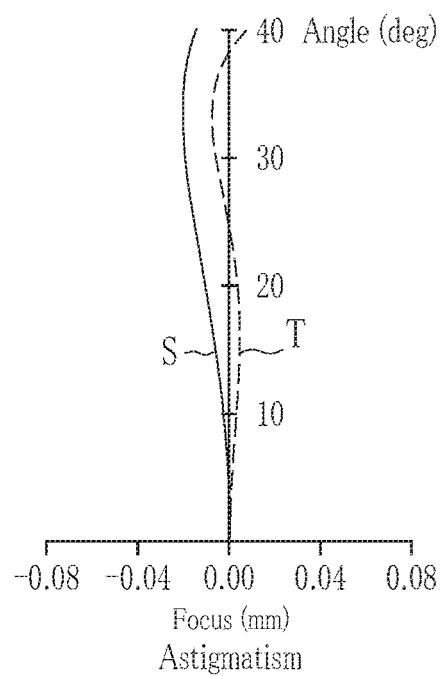
FIG. 7A is a graph which illustrates astigmatism at 20° C. in Example 2.
Figure 7B:
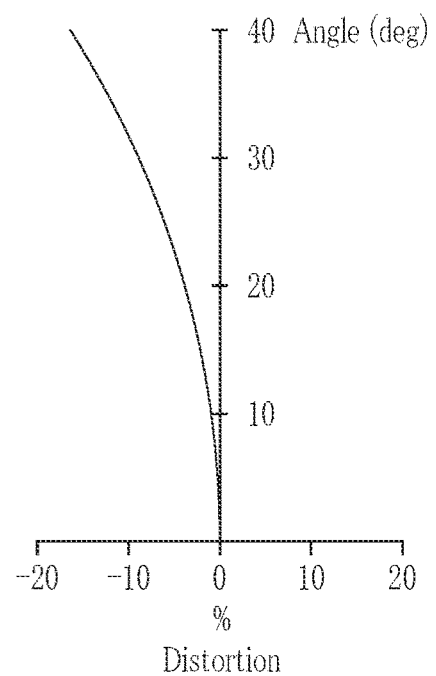
FIG. 7B is a graph which illustrates distortion at 20° C. in Example 2.
Figure 8:
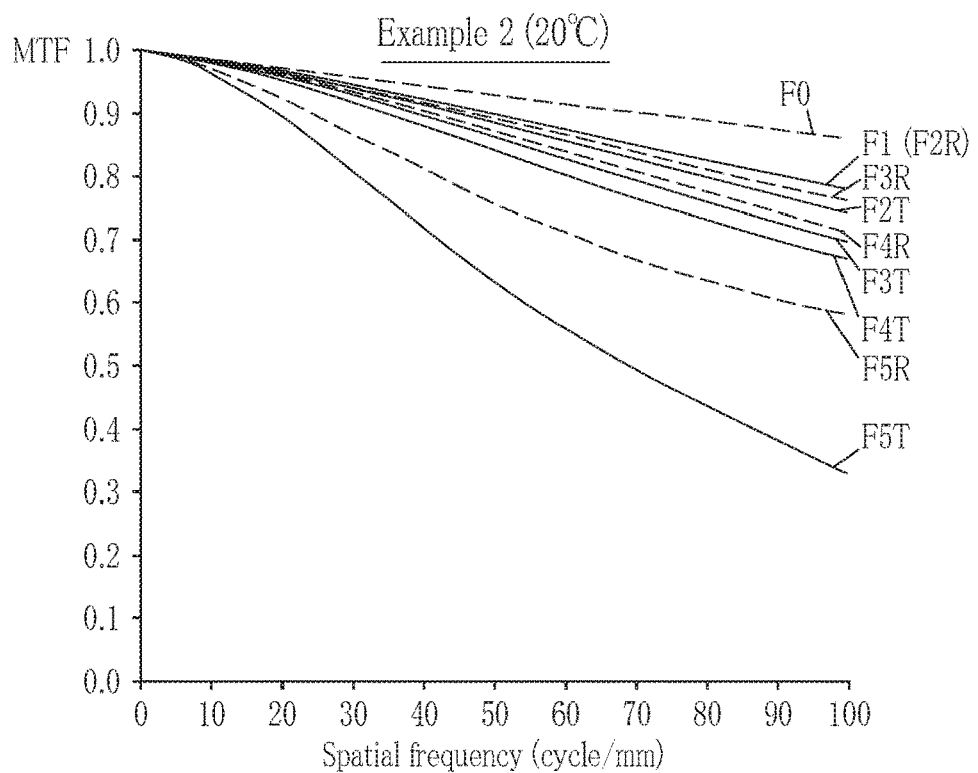
FIG. 8 is a graph which illustrates MTF at 20° C. in Example 2.
Figure 9:
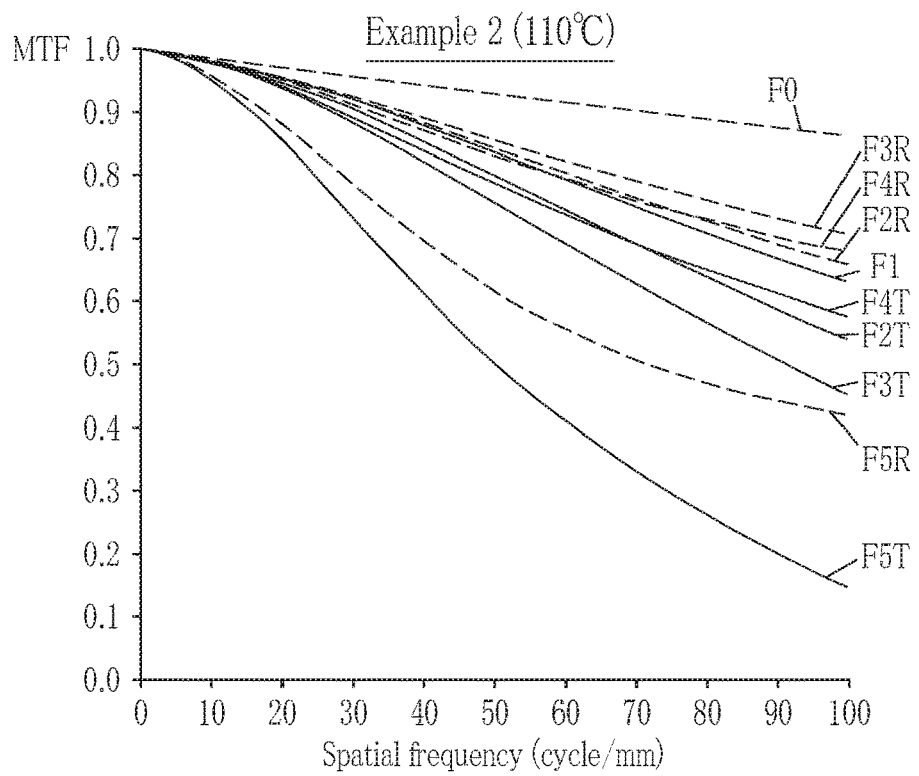
FIG. 9 is a graph which illustrates MTF at 110° C. in Example 2.
Figure 10:
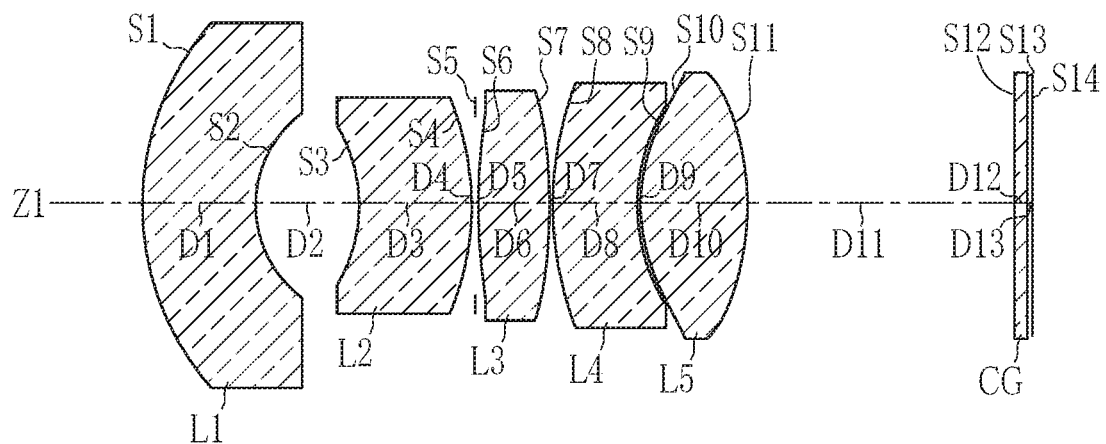
FIG. 10 is an external side view of an imaging lens of Example 3.
Figure 11A:
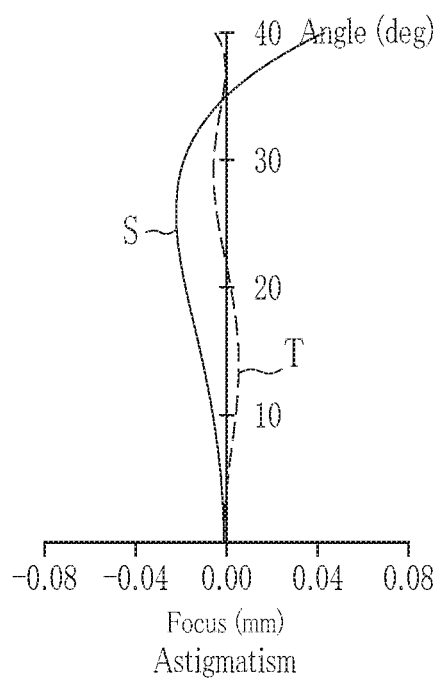
FIG. 11A is a graph which illustrates astigmatism at 20° C. in Example 3.
Figure 11B:
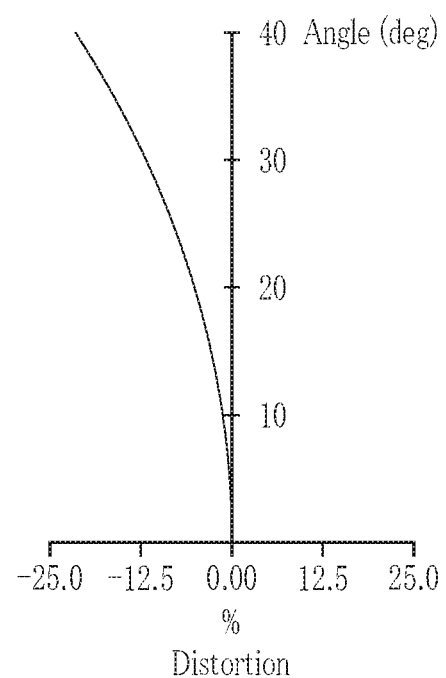
FIG. 11B is a graph which illustrates distortion at 20° C. in Example 3.
Figure 12:
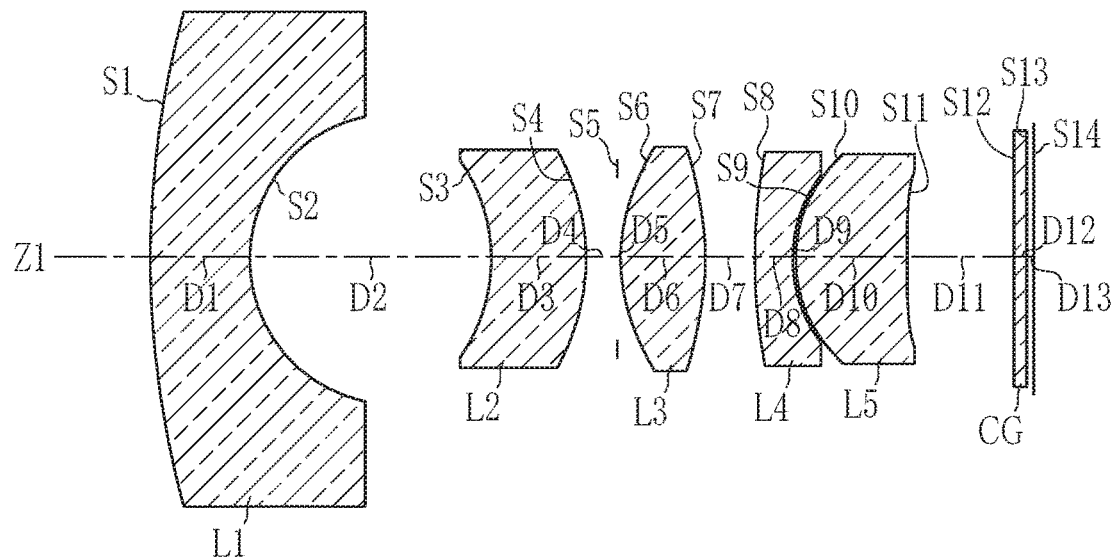
FIG. 12 is an external side view of an imaging lens of Example 4.
Figure 13A:
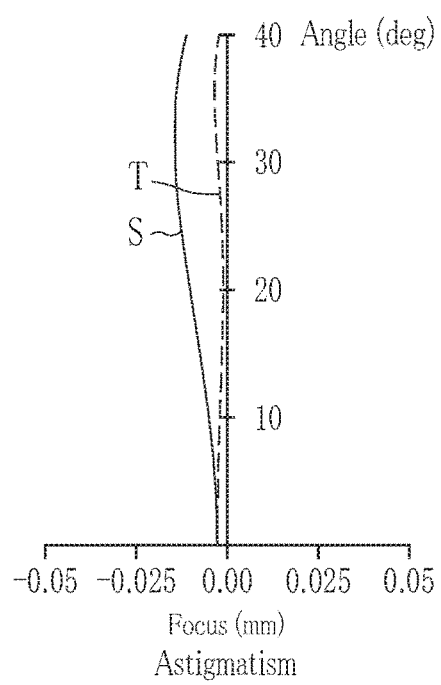
FIG. 13A is a graph which illustrates astigmatism at 20° C. in Example 4.
Figure 13B:
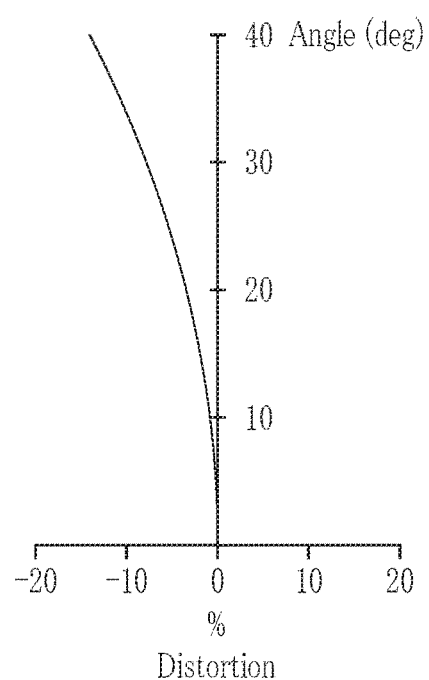
FIG. 13B is a graph which illustrates distortion at 20° C. in Example 4.
Figure 14:
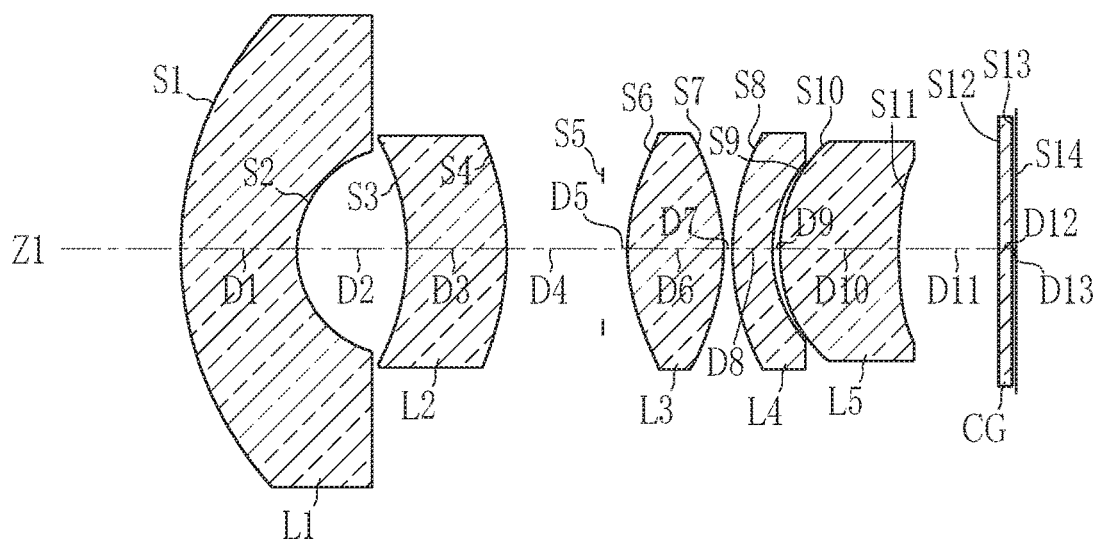
FIG. 14 is an external side view of an imaging lens of Example 5.
Figure 15A:
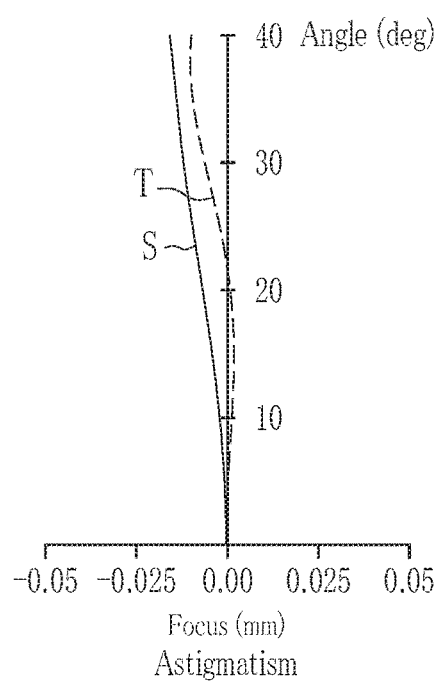
FIG. 15A is a graph which illustrates astigmatism at 20° C. in Example 5.
Figure 15B:
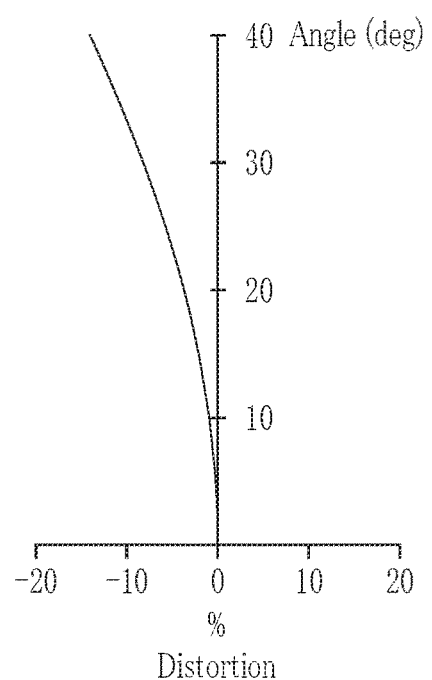
FIG. 15B is a graph which illustrates distortion at 20° C. in Example 5.
Figure 16:
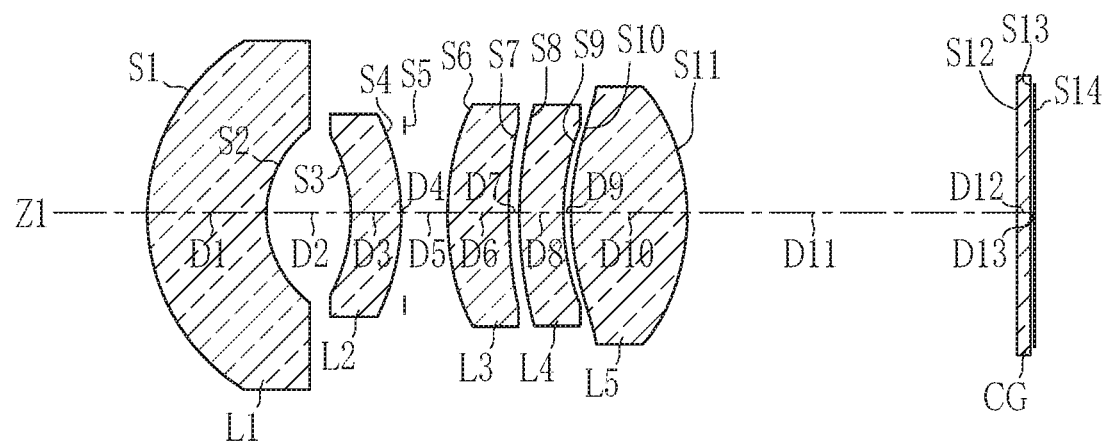
FIG. 16 is an external side view of an imaging lens of Example 6.
Figure 17A:
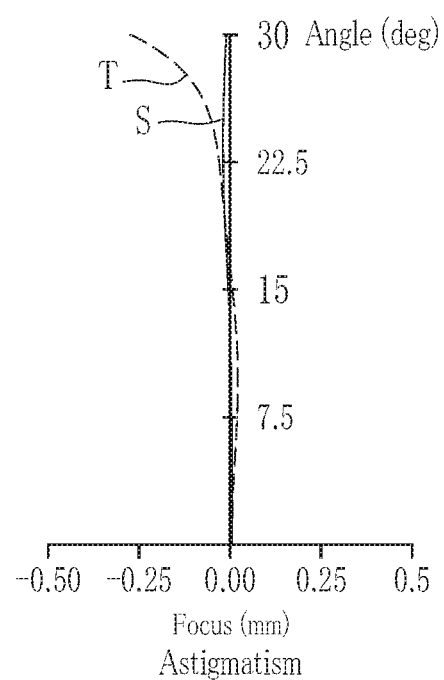
FIG. 17A is a graph which illustrates astigmatism at 20° C. in Example 6.
Figure 17B:
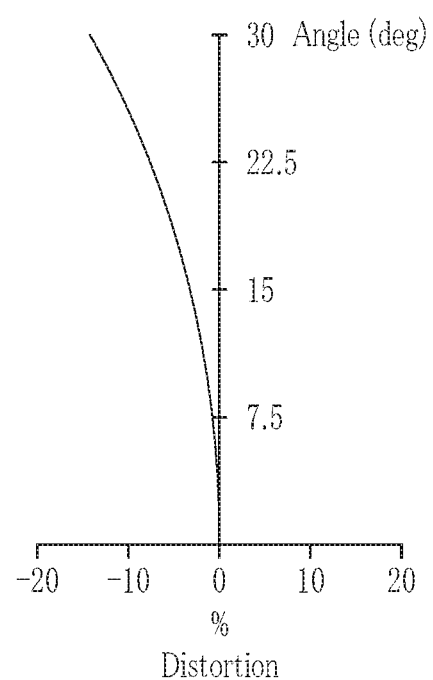
FIG. 17B is a graph which illustrates distortion at 20° C. in Example 6.
Figure 18:
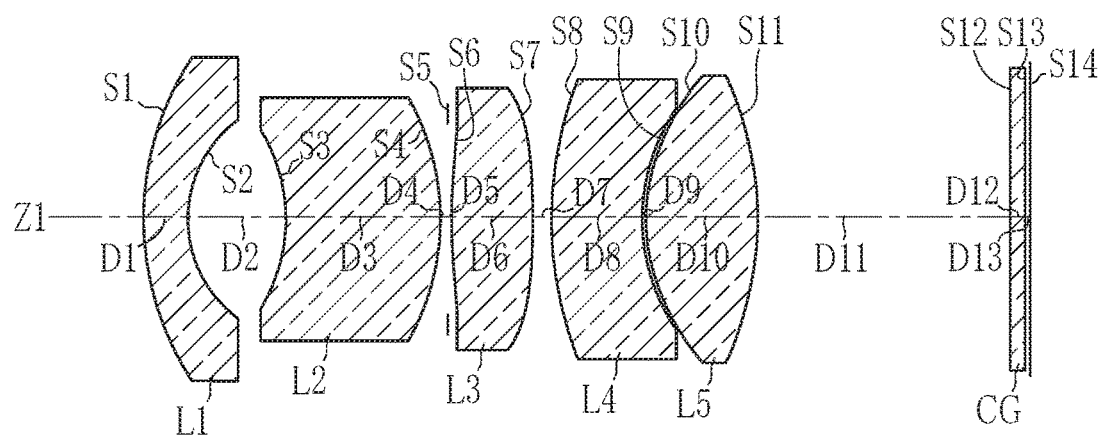
FIG. 18 is an external side view of an imaging lens of Example 7.
Figure 19A:
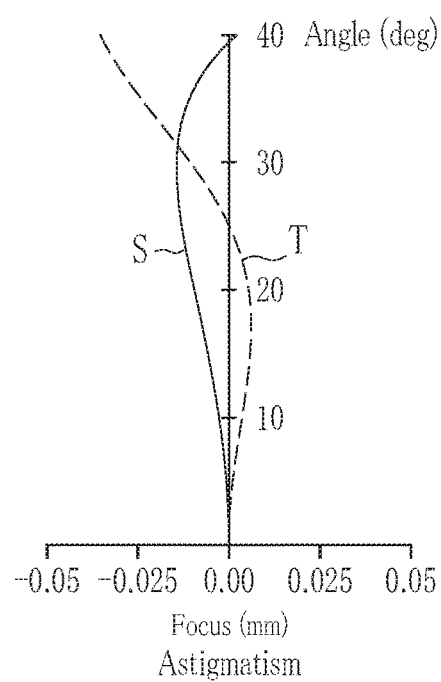
FIG. 19A is a graph which illustrates astigmatism at 20° C. in Example 7.
Figure 19B:
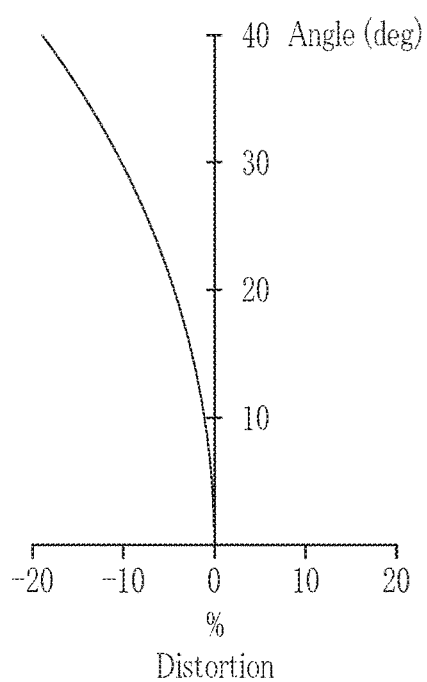
FIG. 19B is a graph which illustrates distortion at 20° C. in Example 7.
Figure 20:
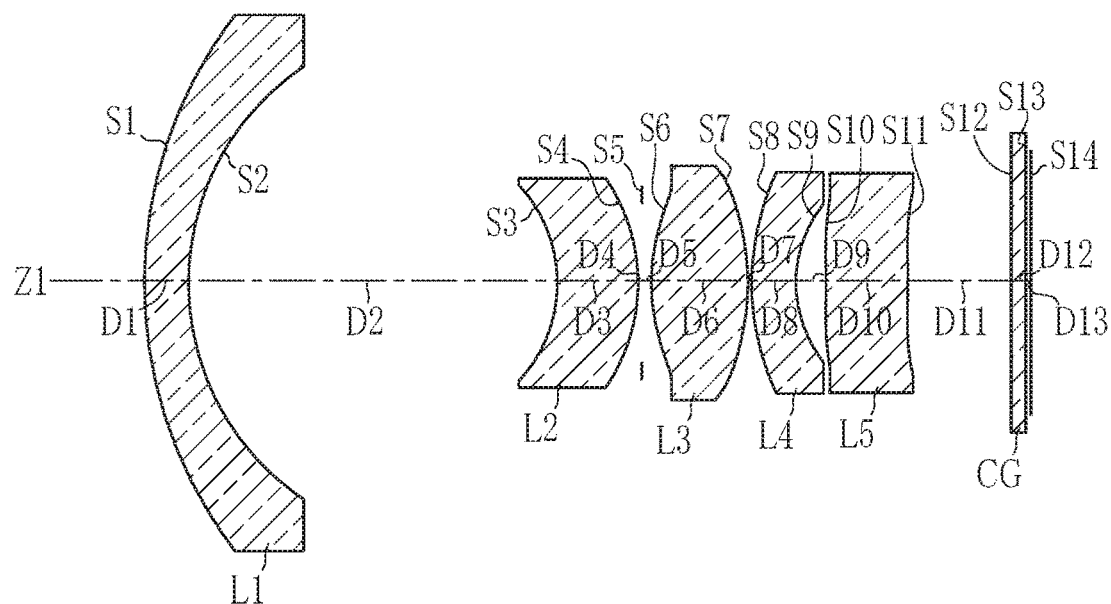
FIG. 20 is an external side view of an imaging lens of Example 8.
Figure 21A:
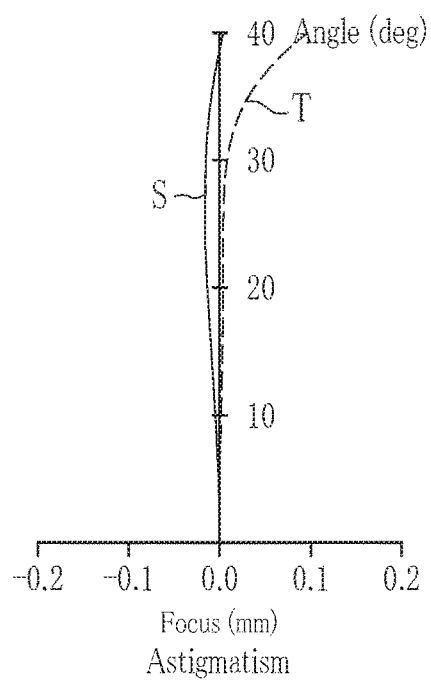
FIG. 21A is a graph which illustrates astigmatism at 20° C. in Example 8.
Figure 21B:
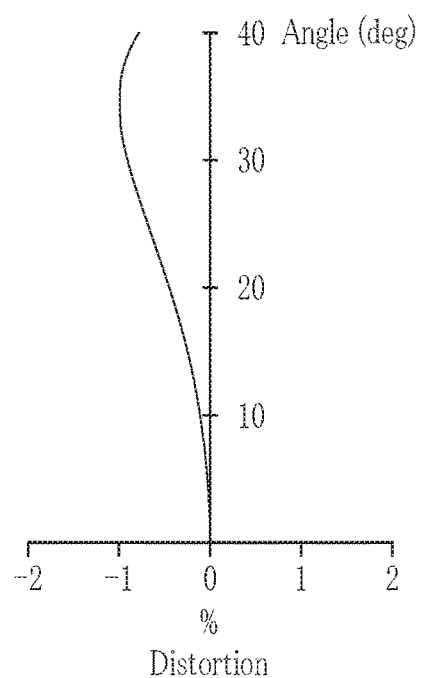
FIG. 21B is a graph which illustrates distortion at 20° C. in Example 8.
Figure 22:
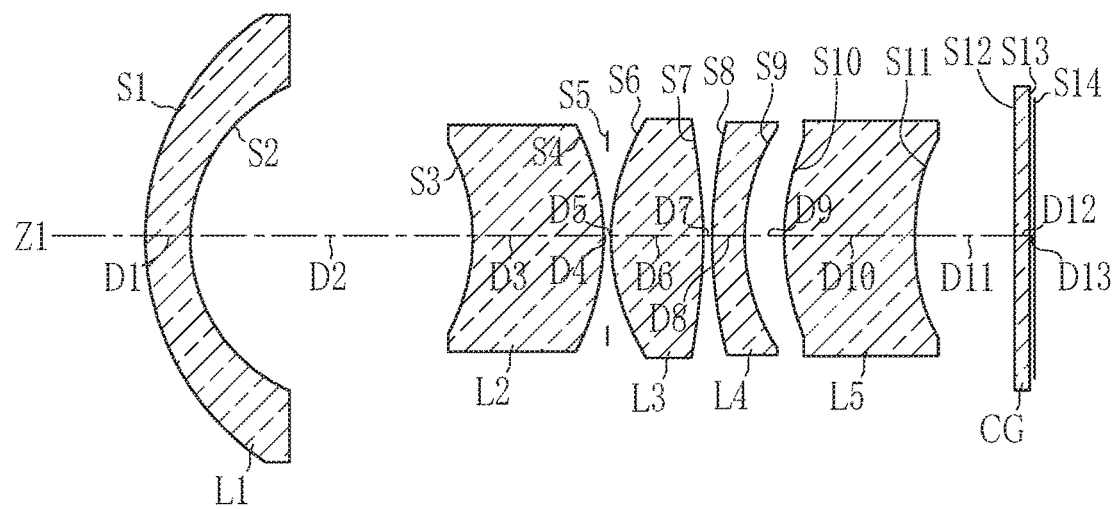
FIG. 22 is an external side view of an imaging lens of Example 9.
Figure 23A:
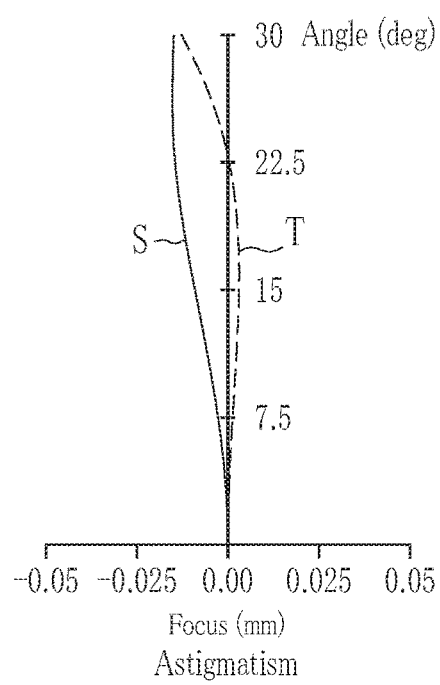
FIG. 23A is a graph which illustrates astigmatism at 20° C. in Example 9.
Figure 23B:
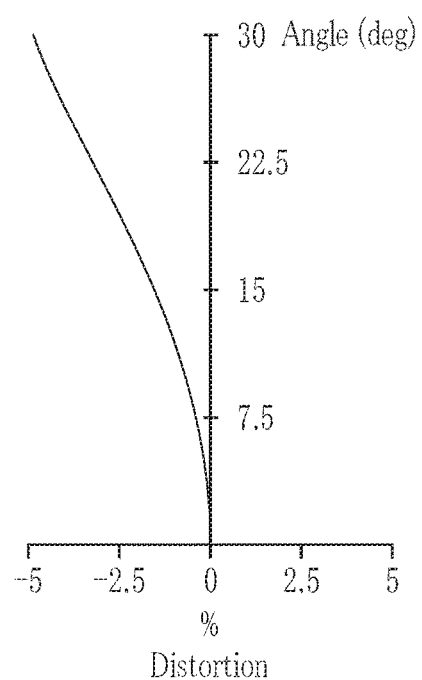
FIG. 23B is a graph which illustrates distortion at 20° C. in Example 9.
Figure 24:
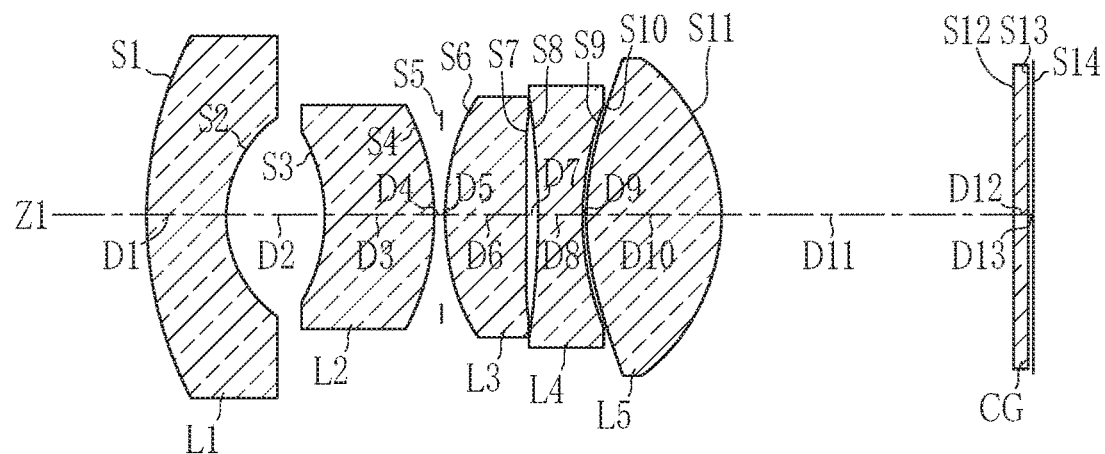
FIG. 24 is an external side view of an imaging lens of Example 10.
Figure 25A:
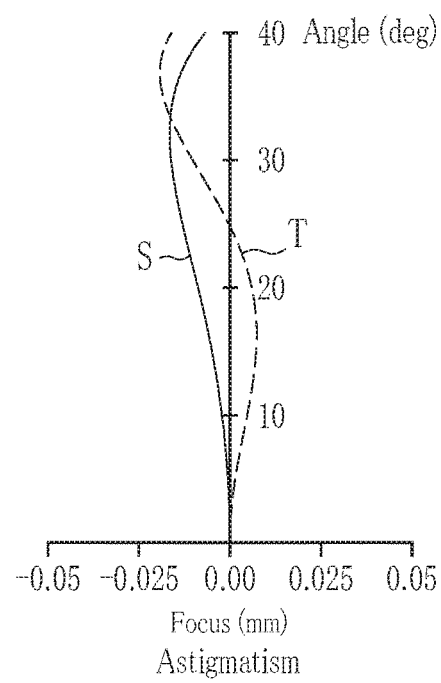
FIG. 25A is a graph which illustrates astigmatism at 20° C. in Example 10.
Figure 25B:
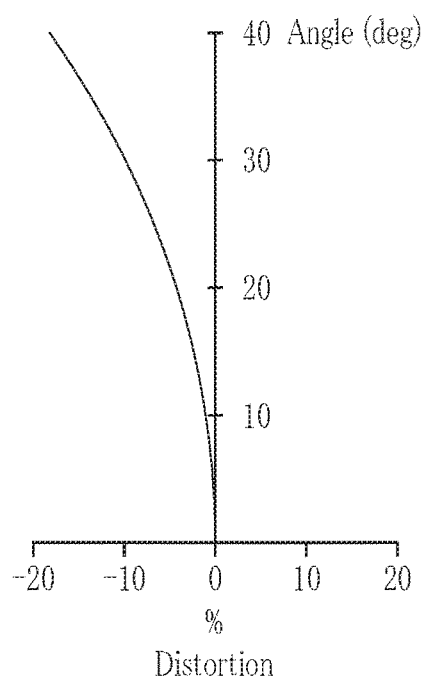
FIG. 25B is a graph which illustrates distortion at 20° C. in Example 10.
Figure 26:
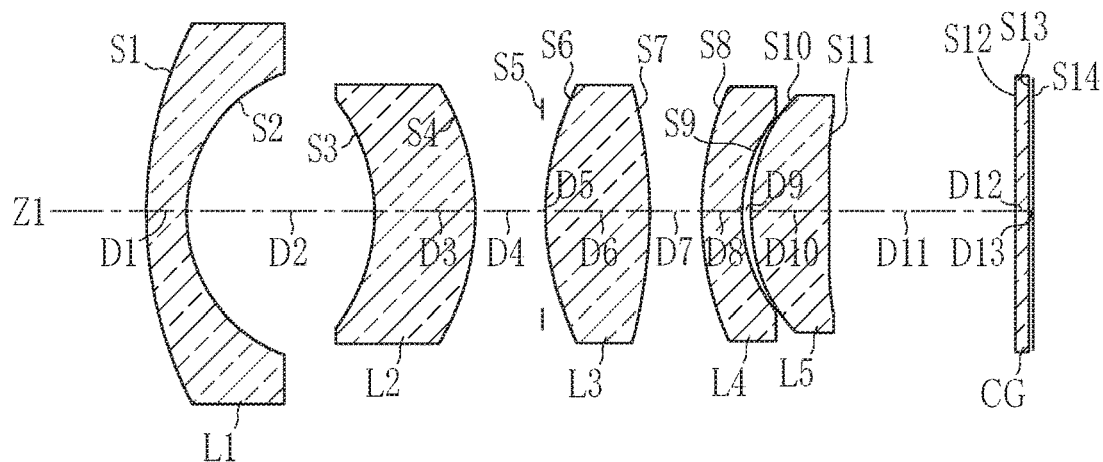
FIG. 26 is an external side view of an imaging lens of Example 11.
Figure 27A:
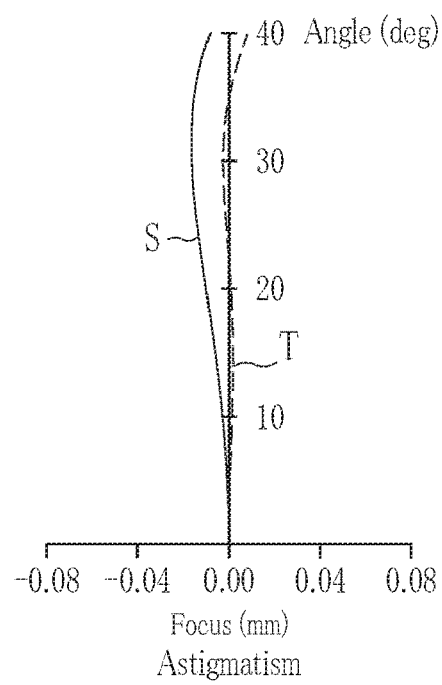
FIG. 27A is a graph which illustrates astigmatism at 20° C. in Example 11.
Figure 27B:
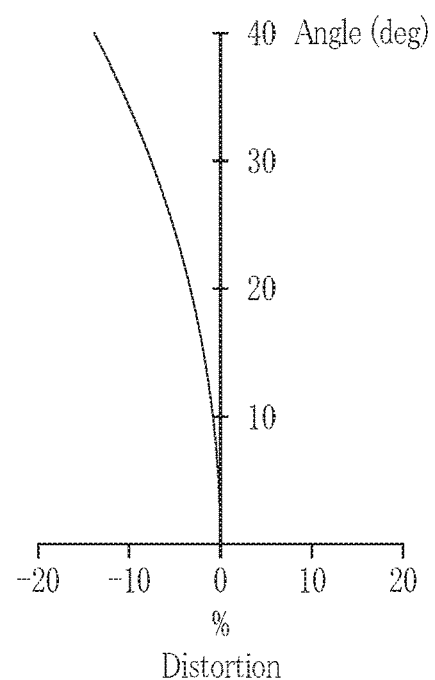
FIG. 27B is a graph which illustrates distortion at 20° C. in Example 11.
Figure 28:
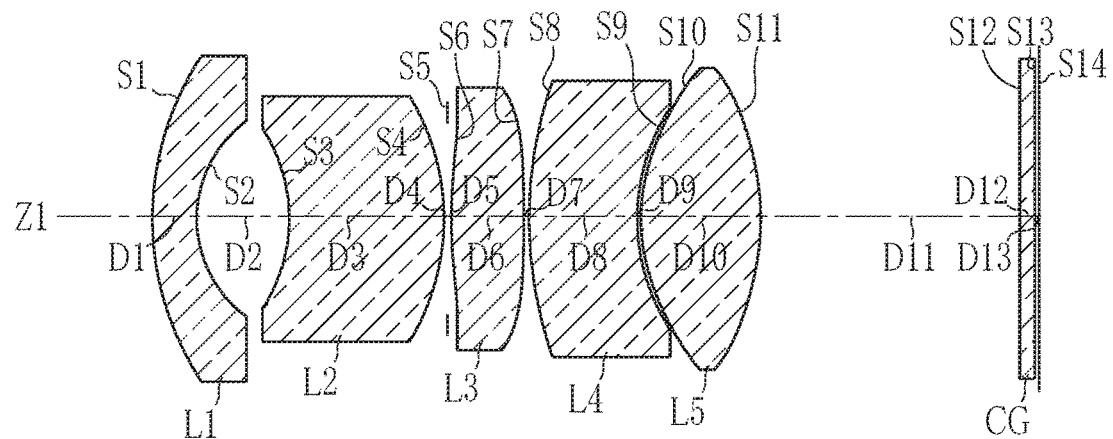
FIG. 28 is an external side view of an imaging lens of Example 12.
Figure 29A:
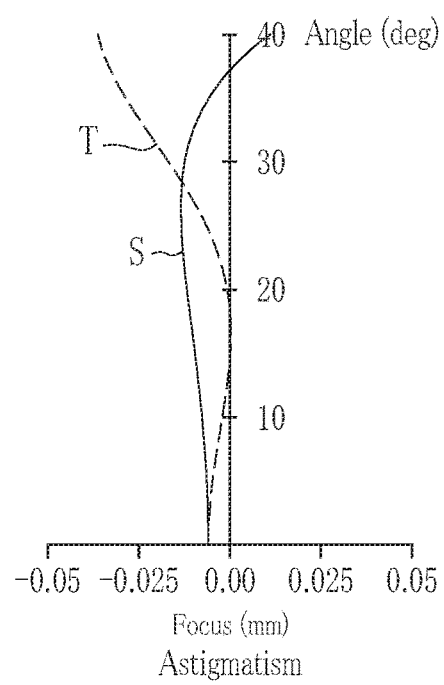
FIG. 29A is a graph which illustrates astigmatism at 20° C. in Example 12.
Figure 29B:
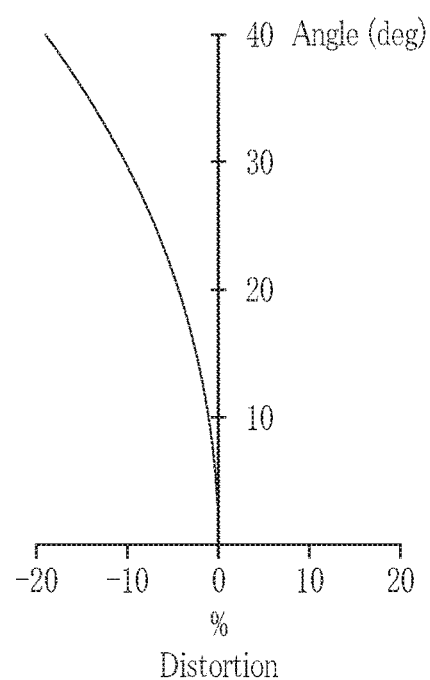
FIG. 29B is a graph which illustrates distortion at 20° C. in Example 12.
Figure 30:
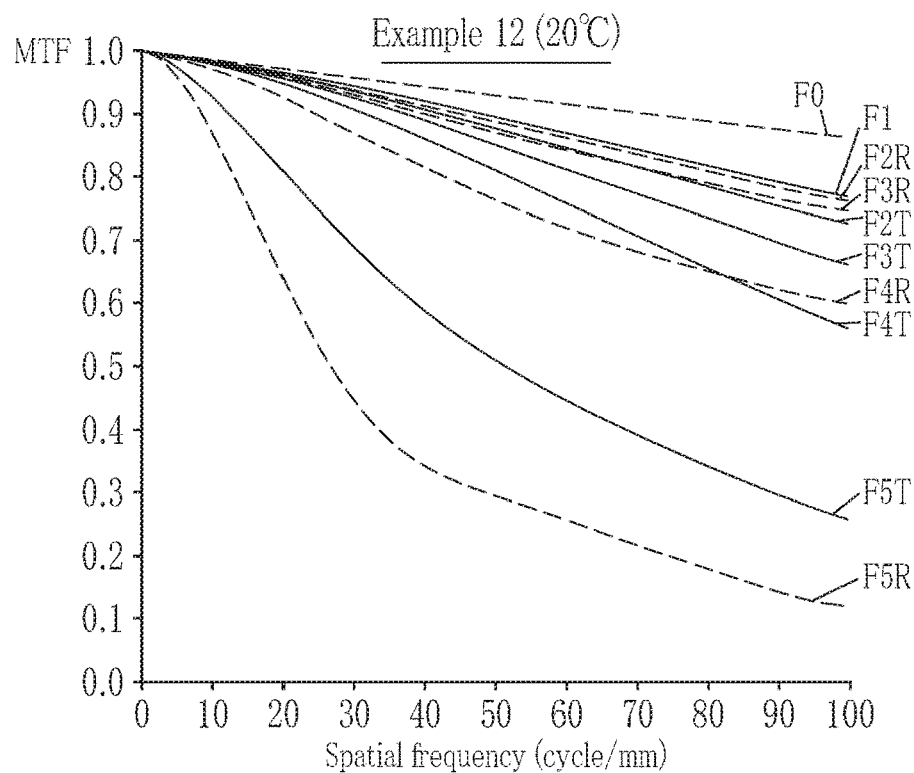
FIG. 30 is a graph which illustrates MTF at 20° C. in Example 12.
Figure 31:
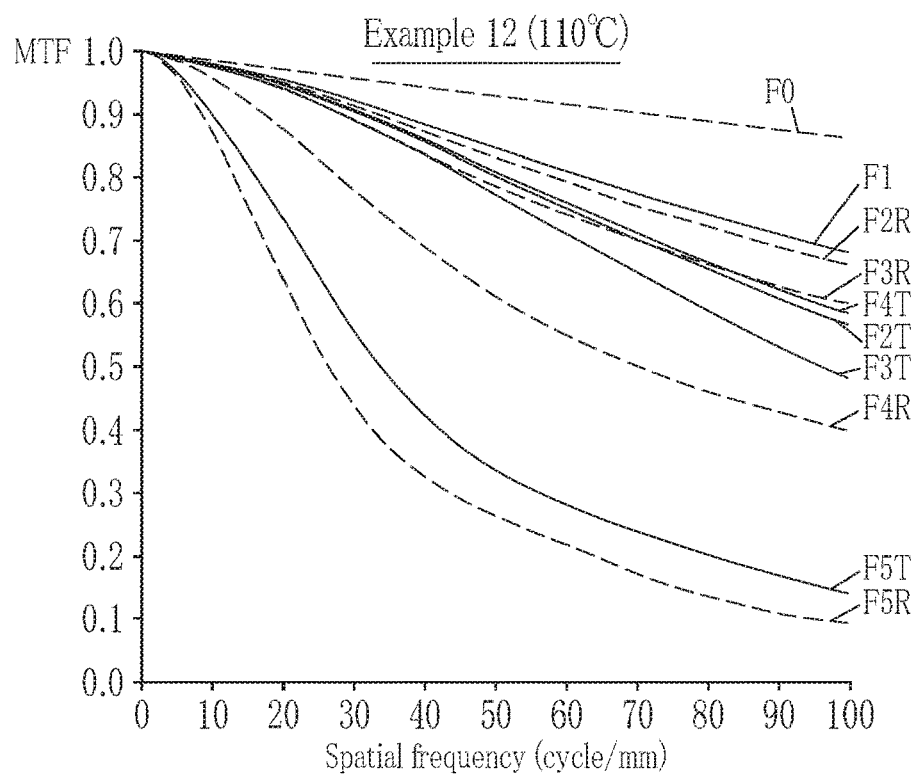
FIG. 31 is a graph which illustrates MTF at 110° C. in Example 12.

FIG. 3A shows astigmatism S in the sagittal (radical) direction and astigmatism T in the tangential (meridional) direction at 20° C. in Example 1, and FIG. 3B shows distortion at 20° C. in Example 1. FIG. 4 shows MTF at 20° C. in Example 1, and FIG. 5 shows MTF at 110° C. in Example 1. In FIGS. 4 and 5, the reference F0 represents the MTF at the theoretical limit (diffraction limit), and the reference F1 represents the MTF on the optical axis Z1. The reference F2R is the MTF of sagittal direction at a point of 10 degrees from the optical axis Z1, and the reference F2T is the MTF of tangential direction at a point of 10 degrees from the optical axis Z1. Also, the reference F3R is the MTF of sagittal direction at a point of 20 degrees from the optical axis Z1, and the reference F3T is the MTF of tangential direction at a point of 20 degrees from the optical axis Z1. The reference F4R is the MTF of sagittal direction at a point of 30 degrees from the optical axis Z1, and the reference F4T is the MTF of tangential direction at a point of 30 degrees from the optical axis Z1. The reference F5R is the MTF of sagittal direction at a point of 40 degrees from the optical axis Z1, and the reference F5T is the MTF of tangential direction at a point of 40 degrees from the optical axis Z1. The graphs that overlap are shown with parentheses.

As can be seen from FIG. 3 to FIG. 5, although the imaging lens 10 in Example 1 has the configuration of five lenses in five groups which features lower cost and excellent mass productivity, stable and good optical performance can be maintained in a wide range of temperature environments. Therefore, the imaging lens 10 of Example 1 has a good temperature compensation performance in a temperature environment where in-vehicle cameras, etc. are placed.

As same as in Example 1 above, the external side view, the various lens data, and the various aberrations of the infrared imaging lens 10 of each of Examples 2 to 11 are shown in FIGS. 5 to 31 and Tables 4 to 36. In Example 3, Example 4, Example 7, Example 8, and Example 12, the third lens L3 in the imaging lens 10 is formed of glass having a negative temperature coefficient of refractive index, as same as in Example 1. Therefore, in Example 3, Example 4, Example 7 and Example 8, the conditions of the conditions (1) to (4), the condition (5), the condition (6), the condition (11) and the condition (12) are satisfied. In Example 12, the conditions of the condition (1), the condition (3) (the condition (2)), the condition (5), the condition (6), the condition (11) and the condition (12) are satisfied, but the condition of the condition (4) is not satisfied.

On the other hand, Example 2, Example 5, Example 6, Example 9, and Example 10 use the imaging lens 10 in which the fifth lens L5 is formed of abnormal dispersion glass. Therefore, in Example 2, Example 5, Example 6, Example 9, and Example 10, the conditions of the condition (1), and the condition (2), the condition (5), and the condition (8), the condition (9), the condition (10), the condition (11), and the condition (12) are satisfied.

Example 11 uses the imaging lens 10 in which both the third lens L3 and the fifth lens L5 are formed of abnormal dispersion glass. Therefore, in Example 11, the conditions of the conditions (1) to (4), the condition (5) and the condition (6) are satisfied for the third lens L3, and the condition (1), and the condition (2), the condition (7), and the condition (8), the condition (9) and the condition (10), the condition (11) and the condition (12) are satisfied for the fifth lens L5.

In these examples, both data of astigmatism and distortion are at 20° C. Further, as shown in Example 2 (see FIG. 8 and FIG. 9) and Example 12 (see FIG. 30 and FIG. 31), since the MTF has a tendency similar to that of Example 1, the MTFs of Examples 3 to 11 are omitted.

TABLE 4

Example 2 Basic lens data

| i | Ri | Di | n | vd | dn/dt (x$10^{-6}$/° C.) |
|---|---|---|---|---|---|
| 1 | 12.303 | 1.2 | 1.51633 | 64.1 | 2.8 |
| 2 | 3.676 | 3.68 | | | |
| 3 | -4.559 | 3 | 1.816 | 46.6 | 4.8 |
| 4 | -6.494 | 1.31 | | | |
| 5 (Stop) | inf | 0.1 | | | |
| 6* | 7.32 | 2.65 | 1.51823 | 58.9 | 0.8 |
| 7* | -8.687 | 1.17 | | | |
| 8 | 10.795 | 1.2 | 1.95906 | 17.5 | 4.3 |
| 9 | 5.541 | 0.16 | | | |
| 10* | 7.511 | 2.77 | 1.497 | 81.5 | -6.4 |
| 11* | -15.372 | 6.25 | | | |
| 12 (CG) | inf | 0.4 | 1.51633 | 64.1 | 2.8 |
| 13 (CG) | inf | 0.12 | | | |
| 14 (Imaging surface) | inf | | | | |

TABLE 5

Example 2 Aspherical data

| Aspherical coefficient | S6 | S7 | S10 | S11 |
|---|---|---|---|---|
| K | 6.86700.E-02 | -3.66204.E+00 | 2.38236.E+00 | -1.84492.E+01 |
| A4 | -3.40959.E-04 | 1.12755.E-03 | 3.10131.E-03 | 1.86449.E-03 |
| A6 | 2.39255.E-06 | -8.35946.E-05 | -1.88450.E-04 | 3.46051.E-05 |
| A8 | -2.03951.E-06 | 7.18843.E-07 | 4.20285.E-06 | 1.18830.E-06 |
| A10 | -5.59601.E-08 | -8.40703.E-08 | -2.32709.E-07 | -3.75390.E-08 |

TABLE 6

Example 2 Lens data

| | |
|---|---|
| $f/(dn_5/dt)$ | -0.83 |
| $f_5/(dn_5/dt)$ | -1.65 |
| $f_5/f_{35}$ | 1.41 |
| $D_{35}/f_{35}$ | 1.06 |
| $TT/f_{35}$ | 3.21 |

TABLE 7

Example 3 Basic lens data

| i | Ri | Di | n | vd | dn/dt (x$10^{-6}$/° C.) |
|---|---|---|---|---|---|
| 1 | 8.402 | 3.50 | 1.48749 | 70.2 | -0.5 |
| 2 | 3.503 | 3.20 | | | |

TABLE 7-continued

Example 3 Basic lens data

| i | Ri | Di | n | vd | dn/dt (x$10^{-6}$/° C.) |
|---|---|---|---|---|---|
| 3 | -4.704 | 3.47 | 1.80400 | 46.6 | 4.8 |
| 4 | -8.424 | 0.10 | | | |
| 5 (Stop) | inf | 0.10 | | | |
| 6* | 17.081 | 2.20 | 1.60300 | 65.4 | -2.4 |
| 7* | -18.466 | 0.10 | | | |
| 8 | 10.273 | 2.62 | 1.95906 | 17.5 | 4.3 |
| 9 | 5.740 | 0.10 | | | |
| 10* | 5.203 | 3.30 | 1.51633 | 64.1 | 2.8 |
| 11* | -8.214 | 8.28 | | | |
| 12 (CG) | inf | 0.40 | 1.51633 | 64.1 | 2.8 |
| 13 (CG) | inf | 0.12 | | | |
| 14 (Imaging surface) | inf | | | | |

TABLE 8

Example 3 Aspherical data

| Aspherical coefficient | S6 | S7 | S10 | S11 |
|---|---|---|---|---|
| K | -1.4648.E+00 | 0.0000.E+00 | -2.5229.E+00 | 1.0000.E+00 |
| A4 | -3.2358.E-05 | -5.5985.E-04 | 6.3648.E-04 | 5.4872.E-04 |
| A6 | -1.1609.E-05 | 1.5982.E-05 | 1.7058.E-05 | -2.7694.E-05 |
| A8 | -1.0817.E-06 | -2.0882.E-06 | -1.8201.E-06 | 3.9109.E-06 |
| A10 | -2.9267.E-08 | 0.0000.E+00 | -5.8648.E-08 | -3.0300.E-07 |

TABLE 9

Example 3 Lens Data

| | |
|---|---|
| $f/(dn_3/dt)$ | −2.87 |
| $f_3/(dn_3/dt)$ | −6.25 |
| $f_3/f_{35}$ | 2.04 |
| $D_{35}/f_{35}$ | 1.13 |
| $TT/f_{35}$ | 3.75 |

TABLE 10

Example 4 Basic lens Data

| i | Ri | Di | n | vd | dn/dt (x10$^{-6}$/° C.) |
|---|---|---|---|---|---|
| 1 | 29.06 | 3.15 | 1.51633 | 64.1 | 2.8 |
| 2 | 4.567 | 7.66 | | | |
| 3 | −5.351 | 3 | 1.804 | 46.6 | 4.8 |
| 4 | −6.876 | 1 | | | |
| 5 (Stop) | inf | 0.1 | | | |
| 6* | 5.711 | 2.69 | 1.53775 | 74.7 | −4.4 |
| 7* | −8.517 | 1.56 | | | |
| 8 | 17.424 | 1.2 | 1.80809 | 22.8 | −0.1 |
| 9 | 4.315 | 0.1 | | | |
| 10* | 4.677 | 3.54 | 1.48749 | 70.2 | −0.5 |
| 11* | −527.796 | 3.49 | | | |
| 12 (CG) | inf | 0.4 | 1.51633 | 64.1 | 2.8 |
| 13 (CG) | inf | 0.12 | | | |
| 14 (Imaging surface) | inf | | | | |

TABLE 11

Example 4 Aspherical data

| Aspherical coefficient | S6 | S7 | S10 | S11 |
|---|---|---|---|---|
| K | −2.19052 | 0 | 0.36617 | 1 |
| A4 | 9.027E−04 | 1.929E−03 | 2.702E−03 | 3.434E−03 |
| A6 | −4.200E−06 | −8.131E−05 | −2.153E−04 | 5.346E−05 |
| A8 | −1.134E−06 | 1.646E−06 | −4.698E−07 | −1.551E−06 |
| A10 | −3.393E−08 | −7.612E−08 | −6.187E−08 | 4.036E−07 |

TABLE 12

Example 4 Lens Data

| | |
|---|---|
| $f/(dn_3/dt)$ | −1 |
| $f_3/(dn_3/dt)$ | −6.25 |
| $f_3/f_{35}$ | −1.54 |

TABLE 12-continued

Example 4 Lens Data

| | |
|---|---|
| $D_{35}/f_{35}$ | 1.21 |
| $TT/f_{35}$ | 3.74 |

TABLE 13

Example 5 Basic lens Data

| i | Ri | Di | n | vd | dn/dt (x10$^{-6}$/° C.) |
|---|---|---|---|---|---|
| 1 | 10.373 | 3.5 | 1.53996 | 59.5 | 1.9 |
| 2 | 3.116 | 3.32 | | | |
| 3 | −6.975 | 3 | 1.804 | 46.6 | 4.8 |
| 4 | −8.529 | 2.89 | | | |
| 5 (Stop) | inf | 0.74 | | | |
| 6* | 5.841 | 2.9 | 1.48749 | 70.2 | −0.5 |
| 7* | −5.073 | 0.27 | | | |
| 8 | 7.25 | 1.2 | 1.95906 | 17.5 | 4.3 |
| 9 | 4.097 | 0.24 | | | |
| 10* | 5.803 | 3.57 | 1.497 | 81.5 | −6.4 |
| 11* | 15.15 | 3.01 | | | |
| 12 (CG) | inf | 0.4 | 1.51633 | 64.1 | 2.8 |
| 13 (CG) | inf | 0.12 | | | |
| 14 (Imaging surface) | inf | | | | |

TABLE 14

Example 5 Aspherical data

| Aspherical coefficient | S6 | S7 | S10 | S11 |
|---|---|---|---|---|
| K | −2.77738 | 0 | 1.84502 | 1 |
| A4 | 6.7421E−04 | 5.0177E−03 | 5.3352E−03 | 2.6990E−03 |
| A6 | 1.3920E−06 | −3.5934E−04 | −6.7097E−04 | 6.0612E−05 |
| A8 | 8.2409E−07 | 2.8520E−05 | 5.2956E−05 | 1.6380E−05 |
| A10 | −3.4151E−07 | −1.1782E−06 | −3.1954E−06 | −6.4238E−07 |

TABLE 15

Example 5 Lens Data

| | |
|---|---|
| $f/(dn_5/dt)$ | −0.67 |
| $f_5/(dn_5/dt)$ | −2.61 |
| $f_5/f_{35}$ | 0.91 |
| $D_{35}/f_{35}$ | 1.37 |
| $TT/f_{35}$ | 4.2 |

TABLE 16

Example 6 Basic lens Data

| i | Ri | Di | n | vd | dn/dt (x10$^{-6}$/° C.) |
|---|---|---|---|---|---|
| 1 | 5.959 | 3.5 | 1.8061 | 40.9 | 7.2 |
| 2 | 3.168 | 2.49 | | | |
| 3 | −4.79 | 1.48 | 1.804 | 46.6 | 4.8 |
| 4 | −6.607 | 0.1 | | | |

TABLE 16-continued

Example 6 Basic lens Data

| i | Ri | Di | n | vd | dn/dt (x10$^{-6}$/° C.) |
|---|---|---|---|---|---|
| 5 (Stop) | inf | 1.26 | | | |
| 6* | 8.799 | 1.8 | 1.60311 | 60.6 | 3.2 |
| 7* | 15.688 | 0.3 | | | |
| 8 | 11.925 | 1.29 | 1.95906 | 17.5 | 4.3 |
| 9 | 7.154 | 0.23 | | | |
| 10* | 7.17 | 3.41 | 1.618 | 63.3 | −3.6 |
| 11* | −6.34 | 9.69 | | | |
| 12 (CG) | inf | 0.4 | 1.51633 | 64.1 | 2.8 |
| 13 (CG) | inf | 0.12 | | | |
| 14 (Imaging surface) | inf | | | | |

TABLE 17

Example 6 Aspherical data

| Aspherical coefficient | S6 | S7 | S10 | S11 |
|---|---|---|---|---|
| K | 1.48513 | −22.83279 | −2.30459 | −0.74771 |
| A4 | 8.41675E−04 | 1.60789E−03 | −3.33815E−04 | −1.41737E−04 |
| A6 | −1.49256E−05 | 3.82592E−05 | 1.72409E−06 | −4.05869E−05 |
| A8 | −9.06009E−07 | −8.14326E−06 | −1.68520E−06 | 2.94111E−06 |
| A10 | 2.17199E−07 | 7.33927E−07 | −6.31141E−08 | −2.53797E−07 |

TABLE 18

Example 6 Lens Data

| | |
|---|---|
| f/(dn$_5$/dt) | −2.5 |
| f$_5$/(dn$_5$/dt) | −1.67 |
| f$_5$/f$_{35}$ | 0.81 |
| D$_{35}$/f$_{35}$ | 0.95 |
| TT/f$_{35}$ | 3.52 |

TABLE 19

Example 7 Basic lens Data

| i | Ri | Di | n | vd | dn/dt (x10$^{-6}$/° C.) |
|---|---|---|---|---|---|
| 1 | 7.813 | 1.20 | 1.51633 | 64.1 | 2.8 |
| 2 | 3.299 | 2.66 | | | |
| 3 | −4.561 | 4.18 | 1.804 | 46.6 | 4.8 |
| 4 | −6.580 | 0.20 | | | |
| 5 (Stop) | inf | 0.10 | | | |
| 6* | 14.328 | 2.20 | 1.603 | 65.5 | −2.4 |
| 7* | −23.391 | 0.50 | | | |
| 8 | 10.220 | 2.46 | 1.95906 | 17.5 | 4.3 |
| 9 | 5.239 | 0.10 | | | |
| 10* | 5.054 | 3.04 | 1.48749 | 70.2 | −0.5 |
| 11* | −7.832 | 6.85 | | | |
| 12 (CG) | inf | 0.40 | 1.51633 | 64.1 | 2.8 |
| 13 (CG) | inf | 0.12 | | | |
| 14 (Imaging surface) | inf | | | | |

TABLE 20

Example 7 Aspherical data

| Aspherical coefficient | S6 | S7 | S10 | S11 |
|---|---|---|---|---|
| K | 0 | 0 | −1.53582 | 1 |
| A4 | −1.24453E−03 | −1.37552E−03 | 1.13863E−03 | 1.48221E−03 |
| A6 | −5.33709E−05 | −8.95013E−05 | −6.70883E−05 | −1.95814E−06 |
| A8 | −7.01251E−06 | −1.04995E−06 | 7.97516E−07 | −2.08877E−06 |
| A10 | 0.00000E+00 | 0.00000E+00 | 1.40271E−07 | 1.84250E−08 |

TABLE 21

Example 7 Lens Data

| | |
|---|---|
| $f/(dn_3/dt)$ | −6.25 |
| $f_3/(dn_3/dt)$ | −3.41 |
| $f_3/f_{35}$ | 1.84 |
| $D_{35}/f_{35}$ | 1.02 |
| $TT/f_{35}$ | 2.94 |

TABLE 22

Example 8 Basic lens Data

| i | Ri | Di | n | vd | dn/dt (×10⁻⁶/° C.) |
|---|---|---|---|---|---|
| 1 | 11.741 | 1.20 | 1.51633 | 64.1 | 2.8 |
| 2 | 6.969 | 9.98 | | | |
| 3 | −3.873 | 2.18 | 1.804 | 46.6 | 4.8 |
| 4 | −4.946 | 0.10 | | | |
| 5 (Stop) | inf | 0.25 | | | |
| 6* | 5.079 | 2.62 | 1.59522 | 67.7 | −6.1 |
| 7* | −5.819 | 0.10 | | | |
| 8 | 6.886 | 1.20 | 1.95906 | 17.5 | 4.3 |
| 9 | 3.399 | 0.81 | | | |
| 10* | −22.676 | 2.21 | 1.48749 | 70.2 | −0.5 |
| 11* | −23.312 | 2.82 | | | |
| 12 (CG) | inf | 0.40 | 1.51633 | 64.1 | 2.8 |
| 13 (CG) | inf | 0.12 | | | |
| 14 (Imaging surface) | inf | | | | |

TABLE 23

Example 8 Aspherical data

| Aspherical coefficient | S6 | S7 | S10 | S11 |
|---|---|---|---|---|
| K | 0.000.E+00 | 0.000.E+00 | −2.863.E+02 | 1.000.E+00 |
| A4 | −1.725.E−03 | 4.922.E−03 | 1.221.E−02 | 1.012.E−02 |
| A6 | −8.384.E−05 | −5.075.E−04 | −8.762.E−04 | −3.006.E−04 |
| A8 | 2.381.E−06 | 1.629.E−05 | −3.653.E−05 | −4.311.E−05 |
| A10 | −2.2737E−06 | −1.2376E−06 | 0.0000E+00 | 2.3623E−06 |

TABLE 24

Example 8 Lens Data

| | |
|---|---|
| $f/(dn_3/dt)$ | −0.88 |
| $f_3/(dn_3/dt)$ | −0.82 |
| $f_3/f_{35}$ | 0.68 |
| $D_{35}/f_{35}$ | 0.95 |
| $TT/f_{35}$ | 3.27 |

TABLE 25

Example 9 Basic lens Data

| i | Ri | Di | n | vd | dn/dt (×10⁻⁶/° C.) |
|---|---|---|---|---|---|
| 1 | 7.102 | 1.2 | 1.51633 | 64.1 | 2.8 |
| 2 | 4.408 | 7.57 | | | |
| 3 | −5.148 | 3.5 | 1.51633 | 64.1 | 2.8 |
| 4 | −6.461 | 0.1 | | | |
| 5 (Stop) | inf | 0.1 | | | |
| 6* | 5.552 | 2.47 | 1.6779 | 55.3 | 1.1 |
| 7* | −11.812 | 0.24 | | | |
| 8 | 12.224 | 0.86 | 1.95906 | 17.5 | 4.3 |
| 9 | 5.292 | 1.06 | | | |

TABLE 25-continued

Example 9 Basic lens Data

| i | Ri | Di | n | vd | dn/dt (×10⁻⁶/° C.) |
|---|---|---|---|---|---|
| 10* | 7 | 3.5 | 1.497 | 81.5 | −6.4 |
| 11* | 7.993 | 2.68 | | | |
| 12 (CG) | inf | 0.4 | 1.51633 | 64.1 | 2.8 |
| 13 (CG) | inf | 0.12 | | | |
| 14 (Imaging surface) | inf | | | | |

TABLE 26

Example 9 Aspherical data

| Aspherical coefficient | S6 | S7 | S10 | S11 |
|---|---|---|---|---|
| K | 0 | 0 | 0.91818 | 3.2362 |
| A4 | −3.08E−04 | 2.02E−03 | 1.85E−03 | 3.21E−03 |
| A6 | −4.72E−06 | −1.06E−04 | −2.80E−04 | −4.49E−05 |
| A8 | −1.05E−06 | 2.77E−06 | 8.43E−06 | 9.68E−07 |
| A10 | 0.00E+00 | 0.00E+00 | −1.15E−06 | −9.45E−07 |

TABLE 27

Example 9 Lens Data

| | |
|---|---|
| $f/(dn_5/dt)$ | −0.9 |
| $f_5/(dn_5/dt)$ | −8.13 |
| $f_5/f_{35}$ | 6.96 |
| $D_{35}/f_{35}$ | 1.09 |
| $TT/f_{35}$ | 3.18 |

TABLE 28

Example 10 Basic lens Data

| i | Ri | Di | n | vd | dn/dt (×10⁻⁶/° C.) |
|---|---|---|---|---|---|
| 1 | 10.42 | 2.16 | 1.51633 | 64.1 | 2.8 |
| 2 | 3.272 | 2.67 | | | |
| 3 | −4.48 | 2.96 | 1.816 | 46.6 | 5.3 |
| 4 | −6.267 | 0.2 | | | |
| 5 (Stop) | inf | 0.1 | | | |
| 6* | 7.179 | 2.2 | 1.80809 | 22.8 | −0.1 |
| 7* | −74.076 | 0.32 | | | |
| 8 | −21.777 | 1.2 | 1.95906 | 17.5 | 4.3 |
| 9 | 8.121 | 0.1 | | | |

TABLE 28-continued

Example 10 Basic lens Data

| i | Ri | Di | n | vd | dn/dt (x10$^{-6}$/° C.) |
|---|---|---|---|---|---|
| 10* | 6.818 | 3.66 | 1.59522 | 67.7 | −2.4 |
| 11* | −5.072 | 7.92 | | | |
| 12 (CG) | inf | 0.4 | 1.51633 | 64.1 | 2.8 |
| 13 (CG) | inf | 0.12 | | | |
| 14 (Imaging surface) | inf | | | | |

TABLE 29

Example 10 Aspherical data

| Aspherical coefficient | S6 | S7 | S10 | S11 |
|---|---|---|---|---|
| K | 0 | 0 | −3.47412 | −0.37462 |
| A4 | 5.9809E−04 | 8.6123E−04 | −7.0013E−04 | 2.5236E−04 |
| A6 | 4.1441E−05 | 1.2398E−04 | 4.1364E−05 | −2.2811E−05 |
| A8 | −2.1599E−07 | −1.5108E−06 | −1.3516E−06 | 8.7553E−07 |
| A10 | 1.7352E−07 | 4.8596E−07 | 7.8210E−09 | −7.9318E−08 |

TABLE 30

Example 10 Lens Data

| | |
|---|---|
| f/(dn$_5$/dt) | −0.89 |
| f$_5$/(dn$_5$/dt) | −0.9 |
| f$_5$/f$_{35}$ | 0.75 |
| D$_{35}$/f$_{35}$ | 1.02 |
| TT/f$_{35}$ | 3.26 |

TABLE 31

Example 11 Basic lens Data

| i | Ri | Di | n | vd | dn/dt (x10$^{-6}$/° C.) |
|---|---|---|---|---|---|
| 1 | 12.07 | 1.2 | 1.6223 | 53.2 | 3.7 |
| 2 | 4.416 | 5.58 | | | |
| 3 | −5.48 | 3 | 1.816 | 46.6 | 5.3 |
| 4 | −7.246 | 1.98 | | | |
| 5 (Stop) | inf | 0.1 | | | |
| 6* | 7.684 | 3.08 | 1.618 | 63.3 | −3.6 |
| 7* | −11.719 | 1.54 | | | |
| 8 | 8.976 | 1.2 | 1.95906 | 17.5 | 4.3 |
| 9 | 4.626 | 0.27 | | | |
| 10* | 6.837 | 2.32 | 1.53775 | 74.7 | −4.4 |
| 11* | −66.253 | 5.51 | | | |
| 12 (CG) | inf | 0.4 | 1.51633 | 64.1 | 2.8 |
| 13 (CG) | inf | 0.12 | | | |
| 14 (Imaging surface) | inf | | | | |

TABLE 32

Example 11 Aspherical data

| Aspherical coefficient | S6 | S7 | S10 | S11 |
|---|---|---|---|---|
| K | 0.09831 | −0.36775 | 2.01855 | −757.21817 |
| A4 | −3.2578E−04 | 9.5732E−04 | 2.3544E−03 | 2.1657E−03 |
| A6 | −1.2959E−06 | −3.3435E−05 | −9.0375E−05 | 2.6792E−05 |
| A8 | −2.5238E−07 | −2.1182E−08 | 1.6729E−06 | 1.7784E−06 |
| A10 | −2.7034E−08 | −4.9860E−09 | −3.4429E−07 | −1.9782E−07 |

TABLE 33

Example 11 Lens Data

| | |
|---|---|
| f/(dn$_3$/dt) | −1.47 |
| f$_5$ (dn$_5$/dt) | −0.83 |
| f$_3$/(dn$_3$/dt) | −2.21 |
| f$_5$/(dn$_5$/dt) | −1.81 |
| f$_3$/f$_{35}$ | 1.01 |
| f$_5$/f$_{35}$ | 1.48 |
| D$_{35}$/f$_{35}$ | 1.07 |
| TT/f$_{35}$ | 3.34 |

TABLE 34

Example 12 Basic lens Data

| i | Ri | Di | n | vd | dn/dt (×10$^{-6}$/° C.) |
|---|---|---|---|---|---|
| 1 | 7.846 | 1.2 | 1.51633 | 64.1 | 2.8 |
| 2 | 3.225 | 2.51 | | | |
| 3 | −4.398 | 4.18 | 1.804 | 46.6 | 4.8 |
| 4 | −6.305 | 0.1 | | | |
| 5 (Stop) | inf | 0.1 | | | |
| 6* | 13.375 | 1.97 | 1.603 | 65.5 | −2.4 |
| 7* | −42.256 | 0.14 | | | |
| 8 | 11.047 | 2.93 | 1.95906 | 17.5 | 4.3 |
| 9 | 5.408 | 0.1 | | | |
| 10* | 5.049 | 3.24 | 1.48749 | 70.2 | −0.5 |
| 11* | −6.798 | 7.02 | | | |
| 12 (CG) | inf | 0.4 | 1.51633 | 64.1 | 2.8 |
| 13 (CG) | inf | 0.12 | | | |
| 14 (Imaging surface) | inf | | | | |

TABLE 35

Example 12 Aspherical data

| Aspherical coefficient | S6 | S7 | S10 | S11 |
|---|---|---|---|---|
| K | 0 | 0 | −1.73639 | 1 |
| A4 | −1.207E−03 | −1.385E−03 | 9.737E−04 | 1.533E−03 |
| A6 | −6.146E−05 | −1.073E−04 | −7.436E−05 | 3.287E−06 |
| A8 | −7.671E−06 | −1.202E−06 | 2.054E−07 | −3.701E−07 |
| A10 | 0.000E+00 | 0.000E+00 | 1.624E−07 | −7.522E−08 |

TABLE 36

Example 12 Lens Data

| | |
|---|---|
| f/(dn$_3$/dt) | −2.29 |
| f$_3$/(dn$_3$/dt) | −7.08 |
| f$_3$/f$_{35}$ | 2.05 |
| D$_{35}$/f$_{35}$ | 1.01 |
| TT/f$_{35}$ | 1.92 |

It is to be noted that various modifications can be made to the above non-limiting embodiment and non-limiting examples. For example, in a non-exhaustive list, in addition to the imaging lens 10 mentioned in the above embodiment, it is possible to configure an imaging lens equivalent in shape, arrangement and imaging performance to the imaging lens 10, by changing the curvature radius, the refractive index, and other lens data.

10: imaging lens
L1: first lens
L2: second lens
L3: third lens
L4: fourth lens
L5: fifth lens
S5: aperture stop
CG: cover glass
S14: imaging surface

What is claimed is:

1. An imaging lens comprising in order from an object side:
a first lens having negative power;
a second lens having negative power;
a third lens having positive power;
a fourth lens having negative power;
a fifth lens having positive power; and
an aperture stop disposed between the second lens and the third lens,
wherein the fourth lens has a meniscus shape convex to the object side,
wherein at least one of the third lens and the fifth lens is formed of glass having a negative temperature coefficient of refractive index, and
wherein a focal length of an entire system of the imaging lens is represented by f, the temperature coefficient of refractive index of the at least one of the third lens and the fifth lens formed of glass having a negative temperature coefficient of refractive index is represented by dn/dt, and the following conditions are satisfied:

$$dn/dt < -0.5 \cdot 10^{-6}/° \text{ C. and}$$

$$-2.90 \cdot 10^6 \text{ mm } ° \text{C.} < f/(dn/dt) < -0.65 \cdot 10^6 \text{ mm } ° \text{C.}$$

2. The imaging lens according to claim 1,
wherein the third lens is formed of glass having a negative temperature coefficient of refractive index, and
wherein the focal length of the entire system of the imaging lens is represented by f, the temperature coefficient of refractive index of the third lens is represented by dn$_3$/dt, and a following condition is satisfied:

$$-2.90 \cdot 10^6 \text{ mm } ° \text{C.} < f/(dn_3/dt) < -0.80 \cdot 10^6 \text{ mm } ° \text{C.}$$

3. The imaging lens according to claim 1,
wherein the third lens is formed of glass having a negative temperature coefficient of refractive index, and
wherein a focal length of the third lens is represented by f$_3$, the temperature coefficient of refractive index of the third lens is represented by dn$_3$/dt, and a following condition is satisfied:

$$-6.50 \cdot 10^6 \text{ mm } ° \text{C.} < f_3/(dn_3/dt) < -0.80 \cdot 10^6 \text{ mm } ° \text{C.}$$

4. The imaging lens according to claim 1,
wherein the third lens is formed of glass having a negative temperature coefficient of refractive index, and
wherein a focal length of the third lens is represented by f$_3$; a focal length of a rear group consisting of the third lens, the fourth lens, and the fifth lens is represented by f$_{35}$; and a following condition is satisfied:

$$0.60 < f_3/f_{35} < 2.05.$$

5. The imaging lens according to claim 1,
wherein the fifth lens is formed of glass having a negative temperature coefficient of refractive index, and
wherein the focal length of the entire system of the imaging lens is represented by f, the temperature coefficient of refractive index of the fifth lens is represented by dn$_5$/dt, and a following condition is satisfied:

$$-2.50 \cdot 10^6 \text{ mm } ° \text{C.} < f/(dn_5/dt) < -0.65 \cdot 10^6 \text{ mm } ° \text{C.}$$

6. The imaging lens according to claim 1,
wherein the fifth lens is formed of glass having a negative temperature coefficient of refractive index, and wherein a focal length of the fifth lens is represented by $f_5$, the temperature coefficient of refractive index of the fifth lens is represented by $dn_5/dt$, and a following condition is satisfied:

$$-8.50 \cdot 10^6 \text{ mm } °C. < f_5/(dn_5/dt) < -0.85 \cdot 10^6 \text{ mm } °C.$$

7. The imaging lens according to claim 1, wherein the fifth lens is formed of glass having a negative temperature coefficient of refractive index, and wherein a focal length of the fifth lens is represented by $f_5$; a focal length of a rear group consisting of the third lens, the fourth lens, and the fifth lens is represented by $f_{35}$; and a following condition is satisfied:

$$0.70 < f_5/f_{35} < 7.00.$$

8. The imaging lens according to claim 1, wherein a focal length of the rear group consisting of the third lens, the fourth lens, and the fifth lens is represented by $f_{35}$; a distance from an object side surface of the third lens to an image side surface of the fifth lens is represented by $D_{35}$; and a following condition is satisfied:

$$0.90 < D_{35}/f_{35} < 1.40.$$

9. The imaging lens according to claim 1, wherein a focal length of the rear group consisting of the third lens, the fourth lens, and the fifth lens is represented by $f_{35}$; a distance from an object side surface of the first lens to an image side surface of the fifth lens is represented by TT; and a following condition is satisfied:

$$2.50 < TT/f_{35} < 4.50.$$

10. The imaging lens according to claim 1, wherein the fifth lens is convex on an image side.

* * * * *